United States Patent
Hoofard et al.

(10) Patent No.: US 12,338,672 B2
(45) Date of Patent: Jun. 24, 2025

(54) POWERED TRAILER SYSTEMS

(71) Applicant: ASSA ABLOY ENTRANCE SYSTEMS AB, Landskrona (SE)

(72) Inventors: Richard K. Hoofard, Dallas, TX (US); L. Blake Whitley, Arlington, TX (US); Daryl Day, Frisco, TX (US)

(73) Assignee: ASSA ABLOY ENTRANCE SYSTEMS AB, Landskrona (SE)

(*) Notice: Subject to any disclaimer, the term of this patent is extended or adjusted under 35 U.S.C. 154(b) by 0 days.

(21) Appl. No.: 17/853,729

(22) Filed: Jun. 29, 2022

(65) Prior Publication Data
US 2023/0003074 A1    Jan. 5, 2023

Related U.S. Application Data

(60) Provisional application No. 63/247,725, filed on Sep. 23, 2021, provisional application No. 63/218,110, filed on Jul. 2, 2021.

(30) Foreign Application Priority Data

Nov. 30, 2021    (SE) .................................... 2130336-7
Nov. 30, 2021    (SE) .................................... 2130337-5
(Continued)

(51) Int. Cl.
*E05F 15/686*    (2015.01)
(52) U.S. Cl.
CPC ....... *E05F 15/686* (2015.01); *E05Y 2900/516* (2013.01); *E05Y 2900/532* (2013.01)
(58) Field of Classification Search
CPC ......... E05Y 2400/656; E05Y 2400/658; E05F 15/673; E05F 15/686; B60L 53/36; B60L 53/16
See application file for complete search history.

(56) References Cited

U.S. PATENT DOCUMENTS 1,775,909 A    9/1930    Mikkelsen
2,362,981 A    11/1944    Philemon
(Continued)

FOREIGN PATENT DOCUMENTS

AU    2005100075 A4    4/2005
CA    2963656 A1    11/2017
(Continued)

OTHER PUBLICATIONS

WO2005/015169 English translation from WIPO (Year: 2005).*
(Continued)

*Primary Examiner* — Daniel J Troy
*Assistant Examiner* — Susan M. Heschel
(74) *Attorney, Agent, or Firm* — Perkins Coie LLP

(57) ABSTRACT

The present disclosure is directed generally to powered trailer systems and, more particularly, to powered trailer systems for opening and closing trailer doors at, e.g., a vehicle loading dock, and to vehicle and/or trailer power delivery and charging systems. A powered trailer door operating system can include a guide track having a lower guide track portion and an upper guide track portion; a drive support coupled to the upper guide track portion having a drive shaft positioned within a central cavity; and a carriage slidingly coupled to the drive support and operably coupled to the trailer door. The carriage can be operably engaged with the drive shaft through the slot such that rotation of the drive shaft causes the carriage to translate along the drive support, thereby moving the trailer door between the open and closed positions.

15 Claims, 17 Drawing Sheets

(30) Foreign Application Priority Data

Nov. 30, 2021 (SE) .................................. 2130338-3
Nov. 30, 2021 (SE) .................................. 2130339-1

(56) References Cited

U.S. PATENT DOCUMENTS

| | | |
|---|---|---|
| 2,883,182 A | 4/1959 | William |
| 2,887,865 A | 5/1959 | Moler |
| 3,051,014 A | 8/1962 | Houk |
| 3,439,728 A | 4/1969 | Martini |
| 3,630,557 A | 12/1971 | Pierce et al. |
| 3,635,277 A | 1/1972 | Bahnsen |
| 3,813,119 A | 5/1974 | Panici |
| 3,894,571 A | 7/1975 | Hinchliff |
| 4,009,051 A | 2/1977 | Kazis et al. |
| 4,010,571 A | 3/1977 | Mcguire et al. |
| 4,147,073 A * | 4/1979 | Mercier ............... E05F 15/673 74/424.78 |
| 4,286,911 A | 9/1981 | Benjamin |
| 4,476,853 A | 10/1984 | Arbogast |
| 4,590,118 A | 5/1986 | Yatabe et al. |
| 4,625,456 A | 12/1986 | Lafontaine |
| 4,626,983 A | 12/1986 | Harada et al. |
| 4,661,758 A | 4/1987 | Whittaker |
| 4,744,121 A | 5/1988 | Swessel et al. |
| 4,821,456 A * | 4/1989 | Nogaki ............... E05F 15/673 49/362 |
| 4,843,373 A | 6/1989 | Trickle et al. |
| 4,860,813 A | 8/1989 | Ballyns et al. |
| 4,878,529 A | 11/1989 | Hormann |
| 4,936,731 A | 6/1990 | Noble |
| 4,988,254 A | 1/1991 | Alexander |
| 5,026,242 A | 6/1991 | Alexander |
| 5,047,748 A | 9/1991 | Trickle |
| 5,056,847 A | 10/1991 | Stillwell et al. |
| 5,085,094 A | 2/1992 | Clawson et al. |
| 5,168,262 A | 12/1992 | Okayama |
| 5,168,267 A | 12/1992 | Trickle |
| 5,181,401 A | 1/1993 | Hodan |
| 5,196,965 A | 3/1993 | Lang et al. |
| 5,277,240 A | 1/1994 | Epema et al. |
| 5,323,098 A | 6/1994 | Hamaguchi et al. |
| 5,403,142 A | 4/1995 | Stewart |
| 5,495,102 A | 2/1996 | Fine |
| 5,544,924 A | 8/1996 | Paster |
| 5,576,533 A | 11/1996 | Tantraporn |
| 5,775,107 A | 7/1998 | Sparkman |
| 5,831,540 A | 11/1998 | Sullivan et al. |
| 5,886,863 A | 3/1999 | Nagasaki et al. |
| 5,886,883 A | 3/1999 | Rail |
| 5,898,585 A | 4/1999 | Sirichote et al. |
| 5,915,446 A | 6/1999 | De |
| 6,082,952 A | 7/2000 | Alexander |
| 6,125,582 A | 10/2000 | Mondragon et al. |
| 6,134,835 A | 10/2000 | Krupke et al. |
| 6,179,036 B1 | 1/2001 | Harvey |
| 6,276,744 B1 | 8/2001 | Huber et al. |
| 6,367,259 B1 | 4/2002 | Timm |
| 6,369,462 B1 | 4/2002 | Siri |
| 6,390,245 B1 | 5/2002 | Metz |
| 6,442,897 B1 | 9/2002 | Mullet |
| 6,476,572 B2 | 11/2002 | Lounsbury |
| 6,523,823 B1 | 2/2003 | Bakoledis |
| 6,543,375 B1 | 4/2003 | Sargent et al. |
| 6,663,527 B2 | 12/2003 | Phelan et al. |
| 6,781,516 B2 | 8/2004 | Reynard et al. |
| 6,787,259 B2 | 9/2004 | Colborn et al. |
| 6,810,817 B1 | 11/2004 | James |
| 6,812,849 B1 | 11/2004 | Ancel |
| 6,917,298 B2 | 7/2005 | Romano et al. |
| 6,972,226 B2 | 12/2005 | Deppe et al. |
| 6,975,226 B2 | 12/2005 | Reynard et al. |
| 7,032,720 B2 | 4/2006 | Jette et al. |
| 7,045,764 B2 | 5/2006 | Beggs et al. |
| 7,119,673 B2 | 10/2006 | Eager et al. |
| 7,162,762 B1 | 1/2007 | Gleason |
| 7,165,486 B2 | 1/2007 | Alexander et al. |
| 7,230,819 B2 | 6/2007 | Muchow et al. |
| 7,254,868 B2 | 8/2007 | Mullet et al. |
| 7,256,703 B2 | 8/2007 | Duvernell et al. |
| 7,264,092 B2 | 9/2007 | Jette |
| 7,274,300 B2 | 9/2007 | Duvernell et al. |
| 7,327,107 B2 | 2/2008 | Mullet et al. |
| 7,333,016 B2 | 2/2008 | Ancel |
| 7,380,375 B2 | 6/2008 | Maly |
| 7,686,061 B2 | 3/2010 | Mullet et al. |
| 7,730,981 B2 | 6/2010 | Mccabe et al. |
| 7,750,890 B2 | 7/2010 | Fitzgibbon et al. |
| 7,864,030 B2 | 1/2011 | Jette |
| 7,956,718 B2 | 6/2011 | Murphy et al. |
| 8,058,970 B2 | 11/2011 | Mullet et al. |
| 8,065,770 B2 | 11/2011 | Proffitt et al. |
| 8,112,949 B2 | 2/2012 | Eungard |
| 8,181,401 B2 | 5/2012 | Eungard |
| 8,286,757 B2 | 10/2012 | Nelson |
| 8,307,589 B2 | 11/2012 | Eungard |
| 8,307,956 B2 | 11/2012 | Andersen et al. |
| 8,345,010 B2 | 1/2013 | Fitzgibbon et al. |
| 8,364,334 B2 | 1/2013 | Au et al. |
| 8,407,842 B2 | 4/2013 | Story et al. |
| 8,410,895 B2 | 4/2013 | Murphy et al. |
| 8,421,611 B1 | 4/2013 | Coshow et al. |
| 8,490,669 B2 | 7/2013 | Fletcher et al. |
| 8,497,761 B2 | 7/2013 | Mcneill et al. |
| 8,510,888 B2 | 8/2013 | Eungard |
| 8,528,622 B2 | 9/2013 | Ehrlich |
| 8,547,234 B2 | 10/2013 | Maly et al. |
| 8,590,087 B2 | 11/2013 | Swessel et al. |
| 8,590,674 B2 | 11/2013 | Jette |
| 8,775,710 B1 | 7/2014 | Miller et al. |
| 8,893,764 B2 | 11/2014 | Mascari et al. |
| 8,959,838 B1 | 2/2015 | Marinelli |
| 8,976,006 B2 | 3/2015 | Krupke et al. |
| 8,978,562 B2 | 3/2015 | Nagamine et al. |
| 9,211,889 B1 | 12/2015 | Hoetzer et al. |
| 9,230,419 B2 | 1/2016 | Beggs et al. |
| 9,274,522 B2 | 3/2016 | Boos et al. |
| 9,283,935 B2 | 3/2016 | Fujioka |
| 9,487,984 B2 | 11/2016 | Wachtell et al. |
| 9,517,902 B2 | 12/2016 | Harrington |
| 9,564,072 B2 | 2/2017 | Senfleben et al. |
| 9,623,859 B2 | 4/2017 | Lavoie et al. |
| 9,633,537 B2 | 4/2017 | Beggs et al. |
| 9,656,691 B2 | 5/2017 | Heimberger et al. |
| 9,771,225 B2 | 9/2017 | Stone et al. |
| 9,776,511 B2 * | 10/2017 | Brooks ............... B60K 35/00 |
| 9,777,529 B2 | 10/2017 | Mcneill et al. |
| 9,926,148 B2 | 3/2018 | Hochstein et al. |
| 9,957,121 B2 | 5/2018 | Sveum et al. |
| 10,032,380 B2 | 7/2018 | Mushynski et al. |
| 10,053,904 B2 | 8/2018 | Mcneill et al. |
| 10,081,504 B2 | 9/2018 | Walford et al. |
| 10,096,187 B2 | 10/2018 | Deneen et al. |
| 10,106,342 B2 | 10/2018 | Avalos |
| 10,113,352 B2 | 10/2018 | McNeill et al. |
| 10,227,190 B2 | 3/2019 | Brooks et al. |
| 10,358,858 B2 | 7/2019 | Lietz et al. |
| 10,435,936 B2 | 10/2019 | Lietz et al. |
| 10,444,965 B2 | 10/2019 | Daley et al. |
| 10,494,205 B1 | 12/2019 | Hoofard et al. |
| 10,878,386 B2 | 12/2020 | Hoofard et al. |
| 10,947,069 B2 | 3/2021 | Brooks et al. |
| 11,124,372 B2 | 9/2021 | Hoofard et al. |
| 11,142,413 B2 * | 10/2021 | Hoofard ............... G05D 1/0229 |
| 11,225,824 B2 | 1/2022 | Hoofard et al. |
| 11,256,264 B2 | 2/2022 | Hoofard et al. |
| 11,262,747 B2 | 3/2022 | Hoofard et al. |
| 11,305,953 B2 | 4/2022 | Hoofard et al. |
| 11,358,813 B2 | 6/2022 | Walford et al. |
| 11,507,926 B2 | 11/2022 | Hoofard et al. |
| 11,668,131 B2 | 6/2023 | McNeill et al. |
| 2001/0035667 A1 | 11/2001 | Gaeta |
| 2002/0089427 A1 | 7/2002 | Aratani et al. |
| 2003/0167238 A1 | 9/2003 | Zeif et al. |

(56) References Cited

U.S. PATENT DOCUMENTS

| | | |
|---|---|---|
| 2004/0146384 A1 | 7/2004 | Whelan |
| 2004/0182619 A1 | 9/2004 | Mcgregor et al. |
| 2005/0050438 A1 | 3/2005 | Cheung et al. |
| 2005/0102041 A1 | 5/2005 | Duvernell et al. |
| 2005/0102042 A1 | 5/2005 | Reynard et al. |
| 2005/0126081 A1 | 6/2005 | Patel et al. |
| 2005/0261789 A1 | 11/2005 | Chen |
| 2005/0262549 A1 | 11/2005 | Ritt et al. |
| 2006/0099965 A1 | 5/2006 | Aaron |
| 2006/0119132 A1 | 6/2006 | Rivers et al. |
| 2006/0137261 A1 | 6/2006 | Maly |
| 2006/0145853 A1 | 7/2006 | Richards et al. |
| 2006/0158752 A1 | 7/2006 | Perkes |
| 2006/0181391 A1 | 8/2006 | Mcneill et al. |
| 2006/0235737 A1 | 10/2006 | Fleurant et al. |
| 2006/0289128 A1 | 12/2006 | Ressel et al. |
| 2007/0062422 A1 | 3/2007 | Wotring |
| 2007/0157614 A1 | 7/2007 | Goldman |
| 2007/0256797 A1 | 11/2007 | Orton et al. |
| 2007/0258798 A1 | 11/2007 | Foster et al. |
| 2007/0283806 A1 | 12/2007 | Morrison |
| 2008/0011799 A1 | 1/2008 | Chang |
| 2008/0018438 A1 | 1/2008 | Ehrlich et al. |
| 2008/0022596 A1 | 1/2008 | Boerger et al. |
| 2008/0124203 A1 | 5/2008 | Mcdonald |
| 2008/0127435 A1 | 6/2008 | Maly et al. |
| 2008/0143290 A1 | 6/2008 | Chavakula |
| 2009/0013497 A1 | 1/2009 | Squyres et al. |
| 2009/0024979 A1 | 1/2009 | Chessell et al. |
| 2009/0044191 A1 | 2/2009 | Chai et al. |
| 2010/0073197 A1 | 3/2010 | Eagleton et al. |
| 2010/0146719 A1 | 6/2010 | Swessel et al. |
| 2010/0289623 A1 | 11/2010 | Roesner |
| 2011/0075441 A1 | 3/2011 | Swessel et al. |
| 2011/0203059 A1 | 8/2011 | Whitley et al. |
| 2011/0301800 A1 | 12/2011 | Furuno et al. |
| 2011/0313893 A1 | 12/2011 | Weik |
| 2012/0025964 A1 | 2/2012 | Beggs et al. |
| 2012/0125545 A1 | 5/2012 | Ehrlich |
| 2012/0304558 A1 | 12/2012 | Iglesias et al. |
| 2013/0024334 A1 | 1/2013 | Kozlay |
| 2013/0038731 A1 | 2/2013 | Brey et al. |
| 2013/0117078 A1 | 5/2013 | Weik et al. |
| 2013/0134938 A1* | 5/2013 | Bianco .................. B60L 53/18 320/109 |
| 2013/0188050 A1 | 7/2013 | Winget |
| 2013/0261958 A1 | 10/2013 | Herron |
| 2013/0312205 A1 | 11/2013 | Riviere et al. |
| 2013/0327914 A1 | 12/2013 | Mcneill et al. |
| 2013/0332217 A1 | 12/2013 | Mcneill et al. |
| 2014/0075842 A1 | 3/2014 | Mcneill et al. |
| 2014/0137447 A1 | 5/2014 | Mama |
| 2014/0222971 A1 | 8/2014 | Cooper et al. |
| 2014/0225509 A1 | 8/2014 | Wiegel et al. |
| 2014/0247347 A1 | 9/2014 | Mcneill et al. |
| 2014/0251556 A1* | 9/2014 | Orton .................. E05F 15/676 160/188 |
| 2015/0009046 A1 | 1/2015 | Senfleben et al. |
| 2015/0013083 A1 | 1/2015 | Palmersheim |
| 2015/0039552 A1 | 2/2015 | Moyne |
| 2015/0047132 A1 | 2/2015 | Sveum et al. |
| 2015/0047133 A1 | 2/2015 | Sveum |
| 2015/0294166 A1 | 10/2015 | Kuehnle et al. |
| 2015/0308175 A1 | 10/2015 | Wachtell et al. |
| 2016/0031482 A1 | 2/2016 | Lavoie |
| 2016/0075526 A1 | 3/2016 | Avalos |
| 2016/0090072 A1 | 3/2016 | Eppley et al. |
| 2016/0104364 A1 | 4/2016 | Brooks et al. |
| 2016/0178382 A1 | 6/2016 | Penna et al. |
| 2016/0288833 A1 | 10/2016 | Heimberger et al. |
| 2016/0362135 A1 | 12/2016 | Xu et al. |
| 2016/0368489 A1 | 12/2016 | Aich et al. |
| 2016/0369619 A1 | 12/2016 | Parmeshwar et al. |
| 2017/0017392 A1 | 1/2017 | Castaneda et al. |
| 2017/0043967 A1 | 2/2017 | Walford et al. |
| 2017/0044817 A1 | 2/2017 | Mcneill et al. |
| 2017/0073005 A1 | 3/2017 | Jawad et al. |
| 2017/0106794 A1 | 4/2017 | Constantine |
| 2017/0120734 A1* | 5/2017 | Westerdale .............. B60J 5/108 |
| 2017/0168501 A1 | 6/2017 | Aoki et al. |
| 2017/0174209 A1 | 6/2017 | Lavoie |
| 2017/0205824 A1 | 7/2017 | Nordbruch et al. |
| 2017/0213404 A1 | 7/2017 | Sivalingam et al. |
| 2017/0320685 A1 | 11/2017 | Hoofard et al. |
| 2018/0035606 A1 | 2/2018 | Burdoucci |
| 2018/0278897 A1 | 9/2018 | Seaman et al. |
| 2018/0346029 A1 | 12/2018 | Kabos et al. |
| 2019/0002216 A1 | 1/2019 | Walford et al. |
| 2019/0039425 A1 | 2/2019 | Dodd et al. |
| 2019/0056736 A1 | 2/2019 | Wood et al. |
| 2019/0064835 A1 | 2/2019 | Hoofard et al. |
| 2019/0144218 A1 | 5/2019 | Hoofard et al. |
| 2019/0187716 A1 | 6/2019 | Cantrell et al. |
| 2019/0197318 A1 | 6/2019 | Krishnamurthy et al. |
| 2019/0202646 A1 | 7/2019 | Brooks et al. |
| 2019/0226239 A1 | 7/2019 | Trentham et al. |
| 2019/0301224 A1 | 10/2019 | Barton |
| 2019/0302764 A1 | 10/2019 | Smith et al. |
| 2019/0316403 A1 | 10/2019 | Aiello |
| 2019/0392402 A1 | 12/2019 | Vandergon et al. |
| 2020/0002993 A1 | 1/2020 | Thouin |
| 2020/0018110 A1* | 1/2020 | Lindley .................. E05F 15/686 |
| 2020/0087970 A1 | 3/2020 | Nielson et al. |
| 2020/0115948 A1 | 4/2020 | Lietz et al. |
| 2020/0125074 A1 | 4/2020 | Ramos et al. |
| 2020/0133259 A1 | 4/2020 | Van Wiemeersch et al. |
| 2020/0239242 A1 | 7/2020 | Hoofard et al. |
| 2020/0273133 A1 | 8/2020 | Morris |
| 2020/0334625 A1 | 10/2020 | Conlon |
| 2020/0361326 A1* | 11/2020 | Krucinski .............. B60L 53/35 |
| 2020/0393828 A1 | 12/2020 | Hoofard et al. |
| 2021/0079710 A1 | 3/2021 | Evans et al. |
| 2021/0082220 A1 | 3/2021 | Boerger et al. |
| 2021/0114477 A1* | 4/2021 | Montousse .............. B60L 53/36 |
| 2021/0238908 A1 | 8/2021 | Ramage et al. |
| 2022/0146269 A1 | 5/2022 | Hoofard et al. |
| 2022/0170311 A1 | 6/2022 | McNeill et al. |
| 2022/0243524 A1 | 8/2022 | Hoofard et al. |
| 2022/0306410 A1 | 9/2022 | Hoofard et al. |
| 2022/0338719 A1 | 10/2022 | Walford et al. |
| 2022/0388380 A1 | 12/2022 | Hoofard et al. |

FOREIGN PATENT DOCUMENTS

| | | | |
|---|---|---|---|
| CA | 3067610 A1 | 7/2020 | |
| CN | 2075169 U | 4/1991 | |
| CN | 101716959 A | 6/2010 | |
| CN | 103485613 B | 6/2015 | |
| DE | 19836432 A1 | 3/1999 | |
| DE | 202005008059 U1 | 11/2005 | |
| DE | 102004037933 B3 | 2/2006 | |
| DE | 202004016760 U1 | 3/2006 | |
| DE | 102006014153 A1 | 10/2007 | |
| DE | 202013008638 U1 | 11/2013 | |
| EP | 0729856 A | 9/1996 | |
| EP | 2215612 B1 | 8/2012 | |
| EP | 2660170 A1 | 11/2013 | |
| EP | 2692561 A1 | 2/2014 | |
| FR | 933292 A | 4/1948 | |
| FR | 2797246 A1 | 2/2001 | |
| FR | 2869470 A1 | 10/2005 | |
| GB | 1527046 A | 10/1978 | |
| NL | 8902808 A | 6/1991 | |
| WO | WO-2005045169 A1 * | 5/2005 | ......... E05D 13/1215 |
| WO | 2006066013 A2 | 6/2006 | |
| WO | 2006076538 A2 | 7/2006 | |
| WO | 2008014026 A1 | 1/2008 | |
| WO | 2008014206 A1 | 1/2008 | |
| WO | 2008036087 A1 | 3/2008 | |
| WO | 2009070509 A1 | 6/2009 | |
| WO | 2010077977 A1 | 7/2010 | |
| WO | 2011037839 A1 | 3/2011 | |
| WO | 2015023666 A1 | 2/2015 | |
| WO | 2015023669 A1 | 2/2015 | |

(56) References Cited

FOREIGN PATENT DOCUMENTS

| WO | 2015084167 A1 | 6/2015 |
|----|---------------|--------|
| WO | 2015166339 A1 | 11/2015 |
| WO | 2016007321    | 1/2016 |
| WO | 2016209141 A1 | 12/2016 |
| WO | 2017100716 A1 | 6/2017 |
| WO | 2019090199 A1 | 5/2019 |
| WO | 2019173811 A2 | 9/2019 |
| WO | 2019209773 A1 | 10/2019 |
| WO | 2020156936 A1 | 8/2020 |

OTHER PUBLICATIONS

Dock Lighting Goes Green with the FT Ultra LED Docklight:, APS Resource, News Release. 1 page.
Pentalift introduces industry's first solar powered dock leveler! www.pentalift.com, Jun. 14, 2011, 1 page.
APS&GO—LED Communication System Specification Sheet, APS Resource, For APS1102, Nov. 2009, 2 pages.
Bin et al., Constrained Model Predictive Control for Backing-up Tractor-Trailer System, Proceeding of the 10th World Congress on Intelligent Control and Automation, Jul. 6-8, 2012, Beijing, China, pp. 2165-2170.
Desantis et al., Path-Tracking for Tractor-Trailers with Hitching of Both the On-Axle and the Off-Axle Kind, Proceedings of the 2002 IEEE International Symposium on Intelligent Control, 2002.
Energy Saving Products Brochure, APS Resource, Mar. 2009, 4 pages.
FT Ultra LED Flex Arm Docklight Specification Sheet, APS Resource, Form APS 1168, Nov. 2009, 2 pages.
Fuchs C et al: "3D pose estimation for articulated vehicles using Kalman-filter based tracking", Pattern Ricognition. Image Analysis, Allen Press, Lawrence, KS, US, vol. 26, No. 1, Jul. 23, 2016 (Jul. 23, 2016), pp. 109-113.
High Impact LED Dock Light Specification Sheet, APS Resource, Form APS1171, Nov. 2009, 2 pages.
Kelley Company; Vehicle Restraints brochure; 2008 ; 8 pages.
Manual and Automatic Light Communication Systems, User's Manual, Serco, Oct. 2009, 28 pages.
McGovern et al., An Articulated Truck on a Spreadsheet, Level 3, Issue 1, Nov. 2003, 23 pages.
Model G307K2 Kadet 2 Operator Interface with 7" TFT Display, Red Lion Controls, Inc., Nov. 23, 2015, 4 pages.
Oreh et al., A New Method for Directional Control of a Tractor Semi-Trailer, Australian Journal of Basic and Applied Sciences, 6(12): 369-409, 2012.
Rite-Hite Corporation, Rite-Vu Light Communication Systems Brochure, 6 pages [Not dated].
Safety & Lighting Products Brochure, APS Resource, Sep. 2004, 2 pages.
Serco Vehicle Restraints brochure; 2008; 4 pages.
Serco; Loading Dock Solutions brochure; 2008; 8 pages.
Smart Power Systems International GmbH, Web pages for Hybrid DC/AC Power Supply, Jun. 1, 2004.
Tofael Ahamed: "Navigation of an Autonomous Tractor Using Multiple Sensors", Thesis, Feb. 22, 2008 (Feb. 22, 2008), XP055527539, retrieved from the Internet: URL: https ://tsukuba.repo.nii.ac.jp, [retrieved ōn Nov. 27, 2018], Chapter 9.
International Search Report and Written Opinion for PCT/EP2022/066474, mailed Dec. 22, 2022 by the International Searching Authority, 21 pages.
Swedish Search Report for SE 2130336-7, filed Nov. 30, 2021, mailed Jun. 27, 2022, 2 pages.
Swedish Search Report for SE 2130337-5, filed Nov. 30, 2021, mailed Jun. 30, 2022, 2 pages.
Swedish Search Report for SE 2130338-3, filed Nov. 30, 2021, mailed Jun. 23, 2022, 2 pages.
Swedish Search Report for SE 2130339-1, filed Nov. 30, 2021, mailed Jul. 1, 2022, 2 pages.

\* cited by examiner

POWERED TRAILER SYSTEMS

CROSS-REFERENCE TO RELATED APPLICATIONS

This application claims priority to U.S. Provisional Patent Application No. 63/218,110, filed Jul. 2, 2021, and titled POWERED TRAILER DOOR SYSTEMS, U.S. Provisional Patent Application No. 63/247,725, filed Sep. 23, 2021, and titled POWERED TRAILER SYSTEMS, Swedish Patent Application No. 2130336-7, filed Nov. 30, 2021, Swedish Patent Application No. 2130337-5, filed Nov. 30, 2021, Swedish Patent Application No. 2130338-3, filed Nov. 30, 2021, and Swedish Patent Application No. 2130339-1, filed Nov. 30, 2021, which are incorporated by reference herein in their entireties.

TECHNICAL FIELD

The present disclosure is directed generally to powered trailer systems and, more particularly, to powered trailer systems for opening and closing trailer doors at, e.g., a vehicle loading dock, and to vehicle and/or trailer power delivery and charging systems.

BACKGROUND

Vehicle docking facilities, such as warehouses, typically include multiple vehicle docking stations that facilitate the movement of goods between the facility and a vehicle parked at the docking station. Each vehicle docking station can include docking equipment used to improve the safety and efficiency of moving goods between the facility and the vehicle. A vehicle docking station can include, for example, a vehicle restraint used to ensure that the vehicle does not move away from the docking station during loading and unloading, a dock door used to control access into and out of the warehouse, a dock leveler used to provide a bridge or ramp between the vehicle and the facility, a barrier gate to prevent cargo or personnel from falling out of the docking station when the dock door is open, and an inflatable shelter to provide cover between the vehicle and the facility during loading and unloading. Once the vehicle is restrained and the dock door is opened, the trailer door must be opened to access the cargo within the trailer. Trailer doors are typically roll-up type doors or swing-type doors. Roll-up type doors are manually opened to access the cargo within the trailer once the vehicle is restrained and the dock door is opened. Swing-type trailer doors require dock personnel to manually open the doors for loading and/or unloading the trailer prior to backing the vehicle up to the dock and restraining the vehicle.

DETAILED DESCRIPTION

Figure 1A:
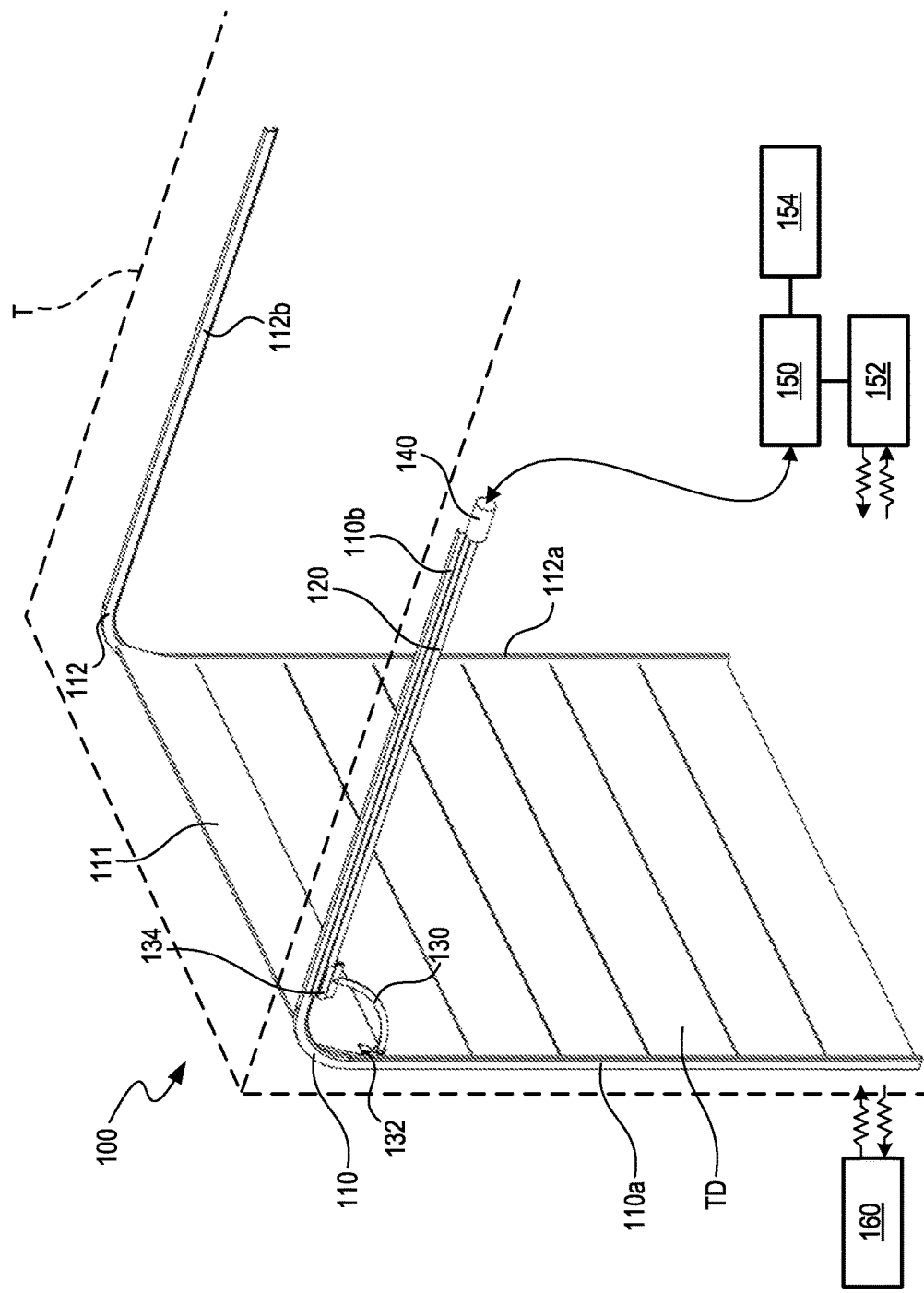
FIGS. 1A and 1B are isometric and cross-sectional elevation views, respectively, illustrating an automated trailer door system configured in accordance with embodiments of the present technology.

The following disclosure describes various embodiments of powered trailer systems, including systems for automated opening and/or closing of trailer doors, e.g., while the trailer is at a loading dock, and systems for vehicle and/or trailer power delivery and charging. Embodiments of the automated trailer door systems described herein may be systems positioned within, or at least partially within, the trailer and suitable for opening and/or closing the trailer door by use of a drive system. Systems of the present technology may also include an internal drive component that receives power from the trailer and/or tractor and interfaces with a corresponding component on the trailer door assembly, e.g., a track, carriage, bracket, door panel, drive screw, etc. to open and/or close the trailer door. Although the following description is generally directed to embodiments of internally positioned automated trailer door systems for opening/closing of the trailer door, the present technology is not limited to such configurations and the systems described herein are suitable for use with other types of automated loading dock and/or trailer door systems. In some embodiments of the present technology, operation of the automated trailer door systems described herein may be controlled by a controller and/or other suitable processor system located at a loading dock, vehicle, or other location in response to, e.g., inputs from an operator and/or inputs from one or sensors (e.g., a trailer presence sensor, a trailer restraint sensor, etc.), computer applications, or other systems. The following disclosure also describes various embodiments of systems for vehicle and/or trailer power delivery and/or charging systems, e.g., while the vehicle/trailer is at a loading dock.

Certain details are set forth in the following description and in FIGS. 1A-7 to provide a thorough understanding of various embodiments of the present technology. By way of example, the systems, components and/or methods described herein may be configured for use with one or more of the systems described in U.S. patent application Ser. No. 17/829,057, filed May 31, 2022, and titled LOADING DOCK AUTOMATED TRAILER DOOR SYSTEMS, which is incorporated by reference herein in its entirety. In other instances, well-known structures, systems, materials and/or operations often associated with trailers, trailer door systems, loading docks, and associated components are not shown or described in detail in the following disclosure to avoid unnecessarily obscuring the description of the various embodiments of the technology. Those of ordinary skill in the art will recognize, however, that the present technology can be practiced without one or more of the details set forth herein, and/or with other structures, methods, components, and so forth. The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Additionally, many of the details, dimensions, angles and other features shown in the Figures are merely illustrative of particular embodiments of the disclosure. Accordingly, other embodiments can have other details, dimensions, angles and features without departing from the spirit or scope of the present invention. Those of ordinary skill in the art will also appreciate that further embodiments of the invention can be practiced without several of the details described below. In the Figures, identical reference numbers identify identical, or at least generally similar, elements.

Figure 1B:
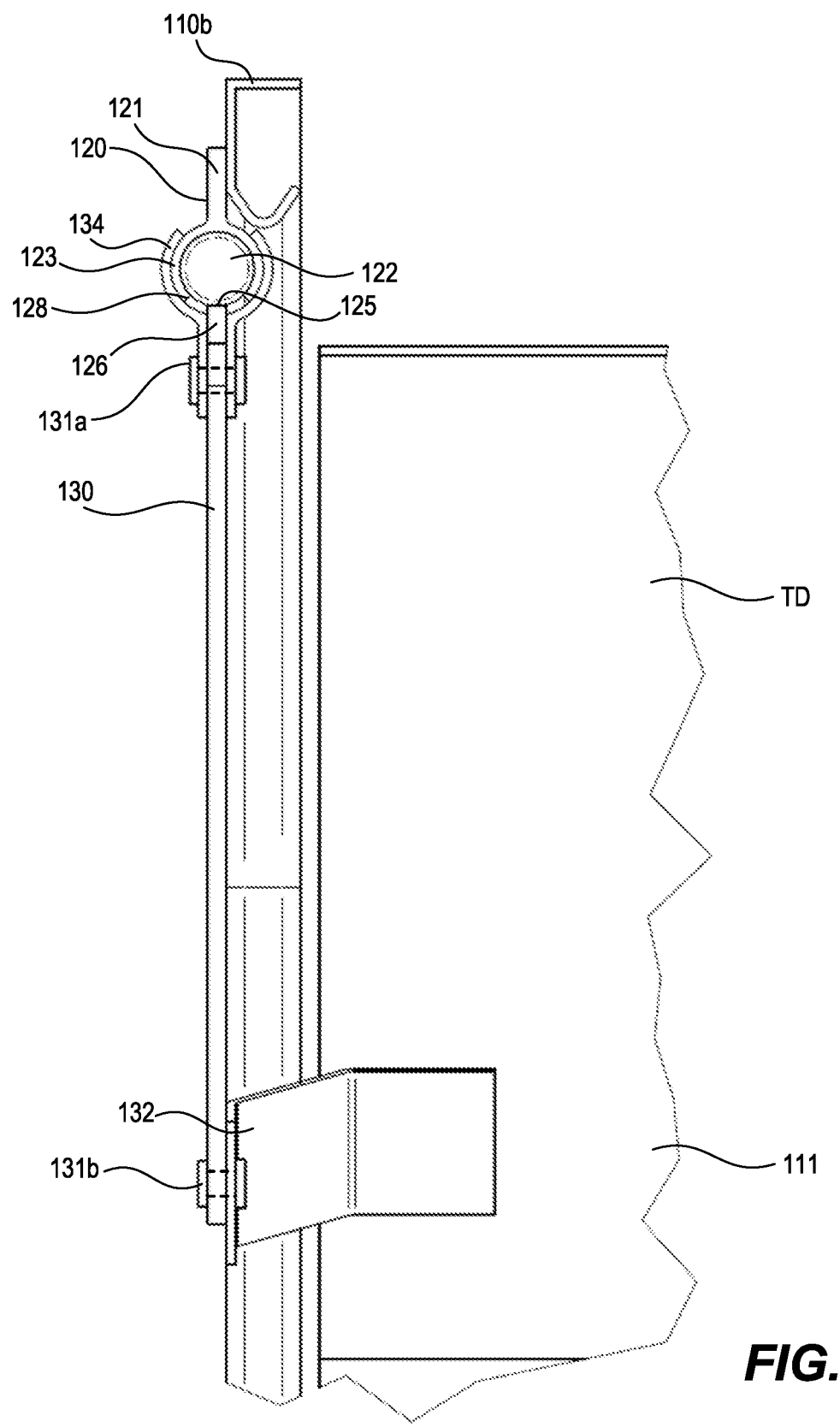

In some embodiments of the present technology (see, e.g., FIG. 1A), an automated trailer door system 100 ("system 100") includes components associated with a trailer door TD of a trailer T for opening and/or closing the trailer door TD. Some embodiments can include components that can interface with one or more components associated with a loading dock LD (see, e.g., FIGS. 1D and 1E). Referring first to FIGS. 1A and 1B, these figures are isometric and cross-sectional elevation views, respectively, illustrating the system 100 configured in accordance with embodiments of the present technology. The system 100 includes components associated with the trailer T that can automate the opening and/or closing of the trailer door TD in response to, e.g., a signal (.e.g., a wireless and/or wired signal) initiated by a tractor/trailer control system, a truck driver, from an operator at a loading dock, from a loading dock control system, etc. The system 100 includes a first guide track 110 and a second guide track 112, having lower guide track portions 110a and 112a, respectively, in a generally vertical orientation for retaining the sides of the trailer door TD when the trailer door TD is in the closed position, and upper guide track portions 110b and 112b, respectively, in a generally horizontal orientation for retaining the sides of the trailer door TD when the trailer door TD is in the open position above the trailer internal space. In some embodiments, the upper track portions 110b and 112b support the trailer door TD in a horizontal position so that the trailer door TD does not tend to move from the open position toward the closed position without actuation by the system 100 or manual input. Although not illustrated in FIGS. 1A and 1B, in some embodiments the trailer door TD can include a counterbalance having a shaft, spring, drum, cable, etc. to provide additional force to assist in opening the trailer door TD or to retain the trailer door TD in the closed position.

Referring to FIGS. 1A and 1B together, the system 100 further includes an elongate drive support 120 which can be operably coupled to either of the first and second guide tracks 110 and 112. FIG. 1B is shown with component 140 (representing a motor, as will be described below) omitted to better illustrate certain components of the system 100. As an example, in the illustrated embodiment the drive support 120 is operably coupled to the upper guide track portion 110b of the first guide track 110. More specifically, the drive support 120 can include an upper flange 121 that can be operably coupled to the upper guide track portion 110b by means of fasteners, welding, and/or other suitable attachment means (not shown). Although not shown in the Figures, in other embodiments, the drive support 120 can be operably coupled to one of the lower guide track portions 110a and 112a, a configuration in which the drive support 120 and the components of the system 100 described below would generally be rotated by 90° to align with the lower guide track portions 110a and 112a.

In the illustrated embodiment, the drive support 120 is configured to rotatably support a drive shaft 122 extending therethrough (see FIG. 1B). More specifically, in the illustrated embodiment, the drive support 120 has a semi-circular portion 123 that partially encloses the outer circumference of the drive shaft 122 therein, with an opening (e.g., a longitudinal slot 128 along the length of the drive support 120) such that a lower portion of the outer surface of the drive shaft 122 is accessible external to the drive support 120 through the longitudinal slot 128. The drive shaft 122 can be a threaded shaft with helical screw-type threads configured to operably engage (e.g., contact, interact with, etc.) teeth 125 of an engagement member 126 (e.g., a toothed rack or other suitable component) such that rotation of the drive shaft 122 about its longitudinal axis translates the engagement member 126 longitudinally fore and aft (depending on the direction of rotation of the drive shaft 122) along the drive shaft 122. The engagement member 126 can be operably coupled to a carriage 134 configured to partially surround and slidingly engage the semi-circular portion 123 of the drive support 120 to maintain the engagement member 126 in sliding engagement with the drive shaft 122 during opening and closing of the trailer door TD. Translation of the carriage 134 along the drive support 120 can move the trailer door TD in the guide tracks 110 and 112 by means of a door arm 130. In some embodiments, the door arm 130 includes a first end portion having a first pin 131a pivotably coupling the first end portion to the carriage 134 and a second end portion having a second pin 131b pivotally coupling the second end portion to a door bracket 132 that is operably coupled to an uppermost door panel 111. During opening or closing of the trailer door TD, the carriage 134 translates along the drive support 120 such that the door arm 130 moves the door within the guide tracks 110 and 112. The pivotable couplings of the door arm 130 to the door bracket 132 and the carriage 134 allow a range of rotational motion of the door arm 130 as the uppermost door panel 111 of the trailer door TD transitions from the lower guide track portions 110a and 112a to the upper guide track portions 110b and 112b.

In some embodiments, the drive shaft 122 operably rotates about its longitudinal axis by rotational input from a suitable motor 140 (e.g., an electric motor; FIG. 1A), either directly by an in-line coupling, or indirectly by a driven gear train, gearbox, chain, drivebelt, and/or other system. In the illustrated embodiment, the motor 140 is positioned toward an end (e.g., a distal end toward the front of the trailer relative to the driving direction) of the drive support 120 and includes an output shaft operably coupled to the drive shaft 122 with an in-line coupling (e.g., where the rotational axis of the output shaft of the motor 140 is aligned with the longitudinal axis of the drive shaft 122). As the output shaft of the motor 140 rotates in a first direction, it rotates the drive shaft 122 in the first direction to translate the carriage 134 axially along the drive support 120 to move the trailer door TD from, e.g., the closed position to the open position. Similarly, when the output shaft of the motor 140 rotates in a second direction opposite the first direction, it rotates the drive shaft 122 in the second direction to translate the carriage 134 axially along the drive support 120 to move the trailer door TD from the open position to the closed position. In these embodiments, the drive support 120, drive shaft 122, the motor 140, and other components of the system 100 are shown mounted on only one of the first and second guide tracks 110 and 112, since a typical counter-balanced trailer door TD does not require a centrally mounted opener. Although not shown, in other embodiments, an output shaft of the motor 140 can be positioned at an angle (e.g., a right angle) relative to the drive shaft 122 and can be operably coupled to the drive shaft 122 by a bevel gear (e.g. a right-angle gearbox with intersecting axes bevel gears, etc.), and/or any other suitable system. In other embodiments, the system 100 may include secondary components (e.g., a second motor, carriage, drive shaft, drive support, etc.) operably coupled to the second guide track 112 for dual operation or redundancy.

The motor 140 can be electrically connected (via, e.g., a wired and/or wireless connection) to a controller 150 (e.g., a processor, programmable logic controller (PLC), and/or other suitable processing device that executes computer readable instructions stored on memory, etc.) positioned on the tractor and/or trailer. In some embodiments, the controller 150 can receive control signals (e.g. wireless and/or wired signals) from, e.g., an operator through a suitable user interface (e.g., a keypad, touchscreen, etc.) on the tractor and/or trailer, from a loading dock control system 160 (e.g., a processor, programmable logic controller (PLC), and/or other suitable processing device that executes computer readable instructions stored on memory, etc.), and/or from a loading dock operator through a suitable user interface (e.g., a keypad, touchscreen, etc.) at a loading dock control panel, at an Automated Guided Vehicle (AGV), etc. The control signals can be transmitted by direct electrical connection and/or wirelessly. In configurations where the control signal is wirelessly transmitted to the controller 150, an antenna 152 can be electrically connected to controller 150 for receiving the control signal from, e.g., a transmitter associated with the loading dock control system 160, a remote controller, a transmitter on the tractor, etc. In some embodiments, the controller 150 can transmit status of the trailer door TD position, faults of the system 100, battery level, or other suitable information related to the system 100 to the trailer, tractor, loading dock control system 160, AGV, etc. for, e.g., display to an operator, storage, etc. The controller 150 can be configured to require that the control signal be authenticated prior to the controller 150 operating the motor 140, e.g., by verifying an authentication level at the user interface after the user inputs a personal identification number (PIN), code, magnetic card, etc. The system 100 may also include a suitable power source 154 to operate the motor 140 and open/close the trailer door TD. In some embodiments, the power source 154 can include a battery positioned in a suitable location on the trailer (e.g., within or mounted to the surface of an interior wall or ceiling, under the floor, etc.). The battery can be charged by, e.g., the tractor power system, regenerative braking, solar, etc., and/or can be charged by a power connection at the loading dock (e.g., with an electrical contact patch or connector drawing power from the loading dock and positioned on, e.g., the trailer bar where it contacts the trailer restraint, etc.), as will be described below with reference to FIGS. 1C-1F.

Figure 1C:
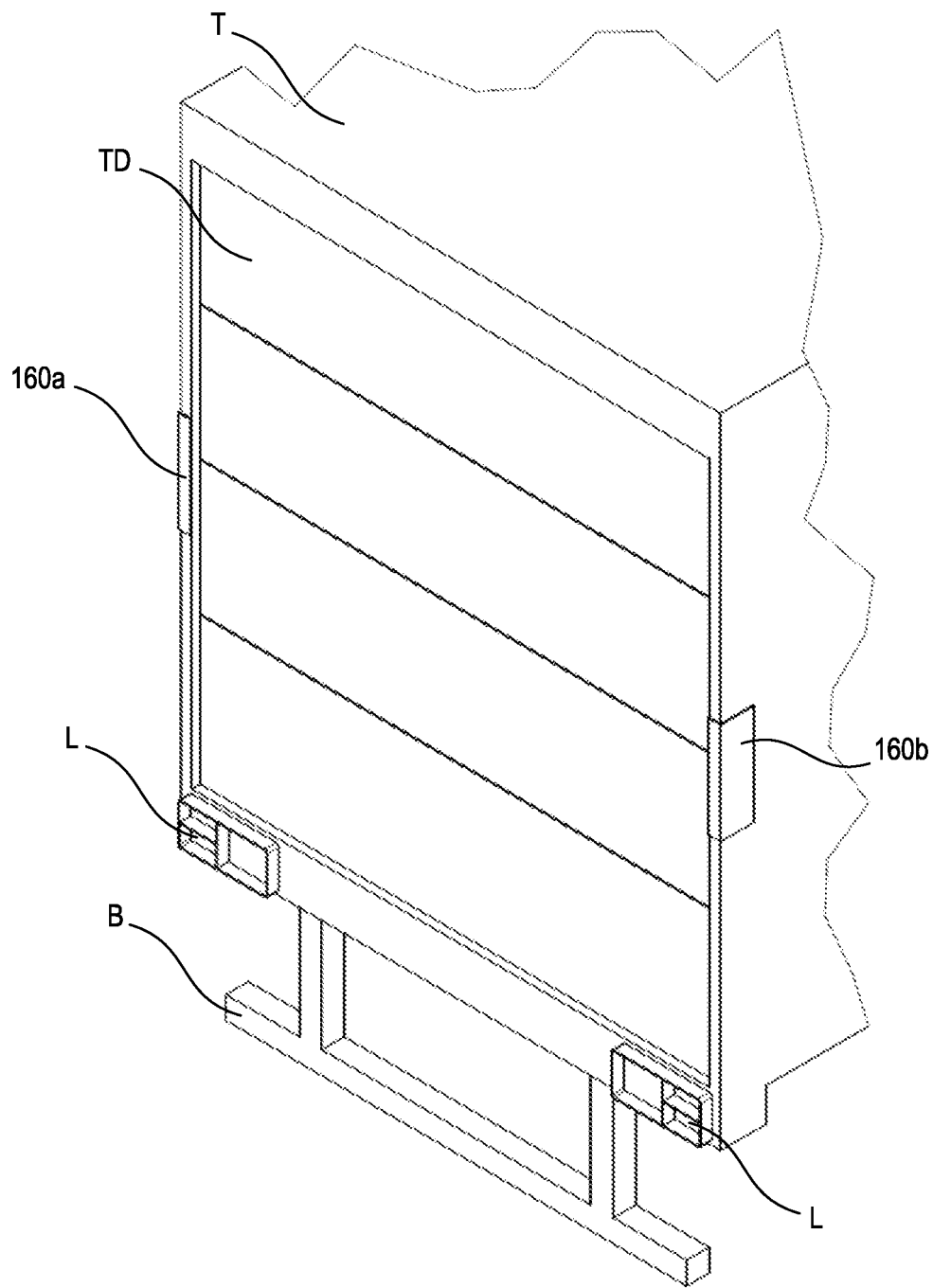
FIGS. 1C and 1D are isometric and plan views, respectively, illustrating a trailer power connection system configured in accordance with other embodiments of the present technology.
Figure 1D:
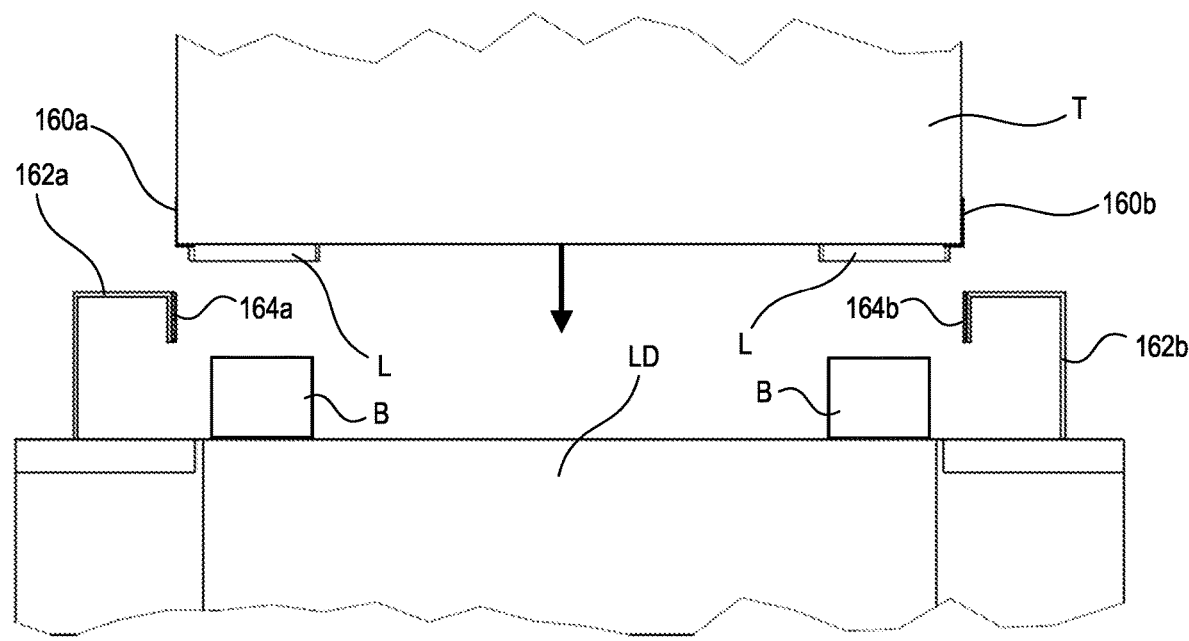

FIGS. 1C and 1D are isometric and plan views, respectively, illustrating an embodiment of a power connection between a loading dock LD and a trailer T suitable for use with the system 100 and/or other trailer and/or tractor systems requiring electrical power. Referring to FIGS. 1C and 1D together, the trailer T can include a rear impact guard B, lights L, a first contact patch 160 *a*, and a second contact patch 160 *b*. In some embodiments, the first and second contact patches 160 *a* and 160 *b* are positioned on exterior surfaces of the trailer T and electrically coupled to the controller 150, antenna 152, and/or battery 154 (FIG. 1A). In the illustrated embodiment, the first and second contact patches 160 *a* and 160 *b* are positioned on aft portions of the side walls of the trailer T. In other embodiments, the contact patches 160 *a*, 160 *b* can be located in other positions on the exterior surfaces of the trailer T, the rear impact guard B, etc. In most embodiments, the contact patches 160 *a*, 160 *b* can be formed of conductive metal (e.g., ferrous metals, copper, etc.). The first contact patch 160 *a* can be positive or negative polarity and the second contact patch 160 *b* can be the other of positive or negative polarity from the first contact patch 160 *a*. The loading dock LD can include first and second protrusions 162 *a* and 162 *b* (which could also be referred to as protruding members, extension members, etc.) that carry first and second loading dock contact patches 164 *a* and 164 *b*, respectively, corresponding respectively in position and polarity to the first and second contact patches 160 *a* and 160 *b* of the trailer T. In use, as a tractor/trailer backs up to the loading dock LD, the loading dock contact patches 164 *a* and 164 *b* contact and electrically couple with the contact patches 160 *a* and 160 *b* of the trailer T to provide, e.g., power to open/close the trailer door TD, charge the battery 154, energize the controller 150 and/or antenna 152, energize tractor systems/charge tractor batteries, etc. The contact patches 164 *a* and 164 *b* can provide power from a loading dock power source via a wired connection. In some embodiments, the protrusions 162 *a* and 162 *b* can be articulable and/or or flexible such that electrical coupling to the trailer T can be made when the trailer is not directly aligned with the dock centerline, at a skewed angle, etc. In embodiments with articulable protrusions 162 *a* and 162 *b*, the trailer can be parked and restrained prior to making the electrical connection to ensure the connection is not lost by movement of the trailer. Although referred to herein as "contact patches," in some embodiments, the contact patches 160 *a*, 160 *b*, 164 *a* and/or 164 *b* can also be referred to as "contact plates," "contact features," and/or simply as "contacts."

In some embodiments, the system 100 can be configured to operate in response to signals from the transmitter of the loading dock control system 160 (FIG. 1A) for actuation of the powered trailer door TD. For example, in some embodiments, the loading dock control system 160 can be configured to send and receive various signals related to status of the trailer door TD (e.g., open or closed, faults, battery level, etc.). The signals can be transmitted via wired or wireless connections and can be a portion of a loading dock workflow or sequence (e.g., an automated or manual sequence). In some embodiments, the system 100 can also be operable manually by a physical switch (e.g., a button or switch on the trailer, tractor, etc.). In some embodiments, the loading dock control system 160 can communicate with an AGV and/or forklift to verify the trailer door open/closed/fault status from the controller 150, and communicate such status to, e.g., the loading dock control system 160.

Figure 1E:
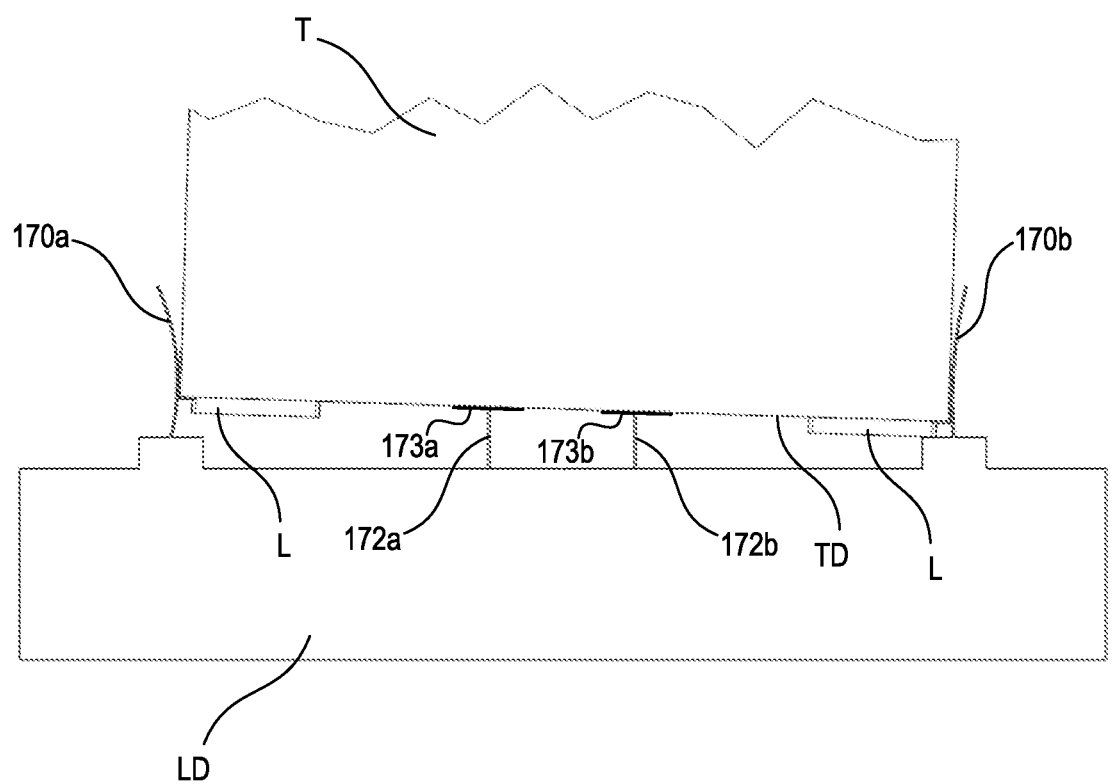
FIG. 1E is a plan view illustrating a trailer power connection system configured in accordance with further embodiments of the present technology.

FIG. 1E is a plan view illustrating a power connection system configured in accordance with further embodiments of the present technology. In a similar manner to the contact patch embodiments described in reference to FIGS. 1C and 1D above, the embodiment in FIG. 1E is configured to provide power between a loading dock LD and a trailer T suitable for use with, e.g., the system 100. In the embodiment shown in FIG. 1E, a first flexible contact member 170a and a second flexible contact member 170b can be positioned at the loading dock LD and configured to contact and provide power through, e.g., the first and second contact patches 160a and 160b, respectively, shown in FIG. 1C. In other embodiments, the first and second flexible contact members 170a and 170b can be positioned to contact other contact patches on the trailer T, such as other contact patches positioned on the vertical sides of the cargo compartment, on the rear impact guard B, on surfaces above or below the trailer door TD, etc. The first and second flexible contact members 170a and 170b can be mounted to an exterior surface of the loading dock LD and made from a resilient material, e.g., metal, polymer, or the like and include at least a conductive portion for transferring power to the trailer T. The conductive portion can be formed of a conductive metal (e.g., ferrous metals, copper, etc.) and can provide power from a loading dock power source via a wired connection. The loading dock LD can further include a first grounding member 172a and a second grounding member 172b positioned to contact corresponding grounding contact patches 173a and 173b on the trailer T, e.g., grounding contact patches on the rear impact guard B (not shown), etc., and configured to provide a ground path (e.g., to the trailer ground connection to the tractor, or other suitable grounded component). The grounding members 172a and 172b and the contact patches 173a and 173b can be formed of a conductive metal (e.g., ferrous metals, copper, etc.). In some embodiments, the grounding members 172a and 172b can adjust in length (e.g., telescoping, collapsible, etc.) to correspond to a varying distance between the loading dock LD and the trailer T, and can be biased against the contact patches 173a and 173b to form a reliable electrical connection. for the power delivered by other components of the power connection system (e.g., the first and second flexible contact members 170a and 170b).

In some embodiments, the first flexible contact member 170a can be configured to provide a first type of power delivery having characteristics, e.g., (alternating or direct current), voltage, amperage, current protection threshold, etc. that differ from the characteristics of a second type of power delivery provided by the second flexible contact member 170b. In some embodiments, components of the system shown in FIG. 1E can be unpowered/unenergized when the trailer T is not present at the loading dock LD, and energized by the loading dock system 160 when, e.g., the trailer T is detected by a sensor (e.g., an optical sensor, electronic sensor, limit switch, pressure sensor, etc.) to be present at the loading dock, when a trailer restraint is engaged with the trailer T, by a manual control input by an operator via, e.g., a suitable user interface (e.g., a keypad, touchscreen, etc.), during a loading dock operation sequence, etc. In some embodiments, the flexible contact members 170a and 170b can deflect such that electrical coupling to the trailer T can be made when the trailer is not aligned with the dock centerline, positioned at a skewed angle (as shown in FIG. 1E), etc. The flexible contact members 170a and 170b can be made from plastic, rubber, or other resilient material, and/or can have joints, hinges, or other articulating portions, and can further include a conductive contact element attached to a side portion of the contact member facing the dock centerline.

By way of example, the first loading dock contact patch 164a and/or the first flexible member 170a can be configured to deliver alternating current (AC) power at 480V (or alternatively at 280V, 208V, 110V, etc.), which may be suitable for charging a hybrid- or electric-powered tractor, while the second loading dock contact patch 164b and/or second flexible member 170b can be configured to deliver direct current (DC) power at 24V (or alternatively at 12V, 6V, etc.), which may be suitable to power the system 100, charge the battery 154, energize the controller 150 and/or antenna 152, power one or more trailer sensors, etc. In this example, the first grounding member 172a can provide a ground path for the power delivered by the first flexible member 170a and the second grounding member 172b can provide a ground path for the power delivered by the second flexible member 170b. In embodiments in which the trailer T does not include an on-board battery, the power delivery by one of the first and second loading dock contact patches 164a and 164b and/or the first and second flexible members 170a and 170b can be configured to directly power various components of the trailer T, such as the system 100.

Figure 1F:
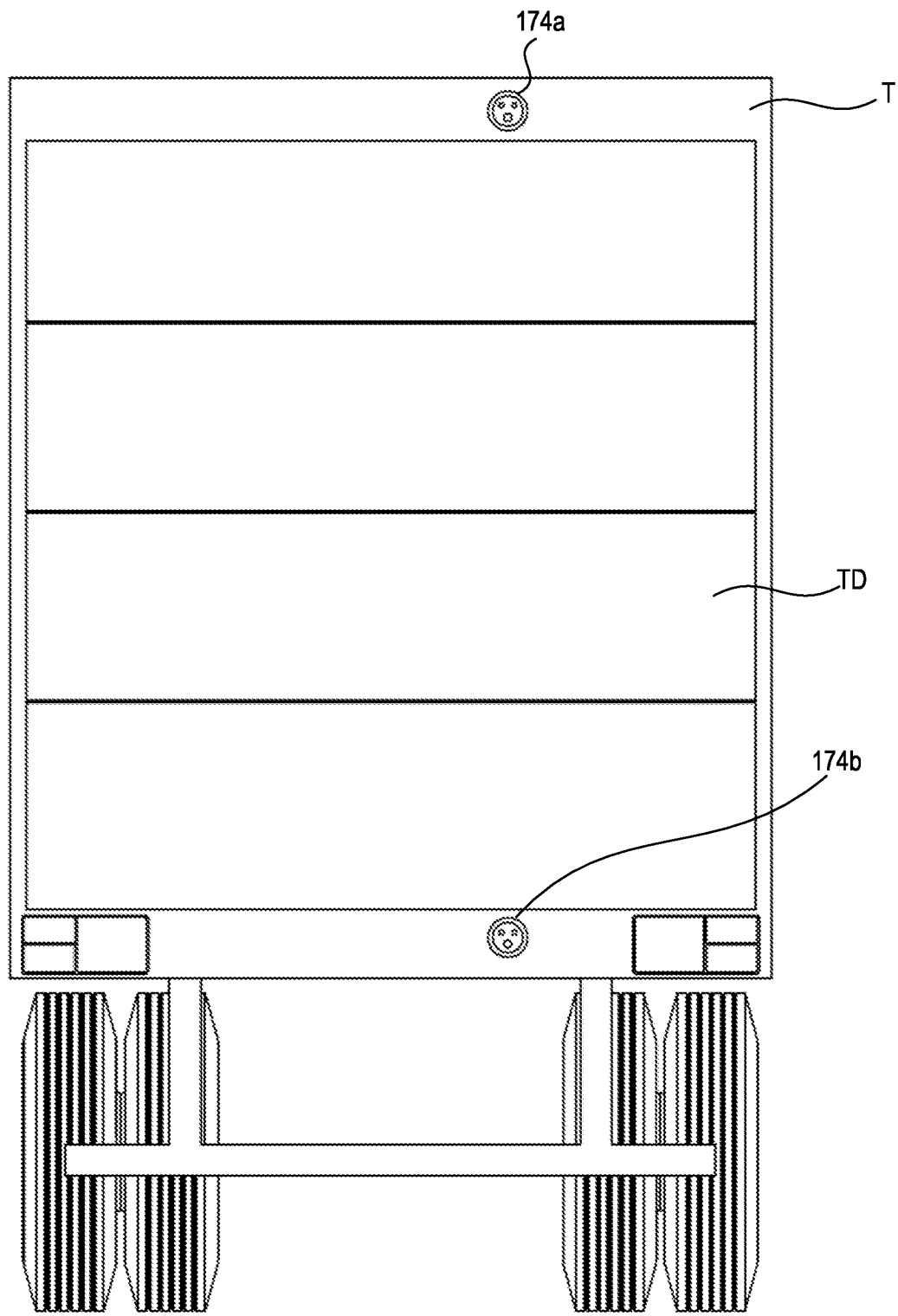
FIG. 1F is a rear elevation view of a trailer illustrating components of a trailer power connection system configured in accordance with embodiments of the present technology.

FIG. 1F is a rear view of a trailer T illustrating a power connection system configured in accordance with other embodiments of the present technology for providing power between a loading dock LD (FIGS. 1D and 1E) and the trailer T, and suitable for use with, e.g., the system 100 described above. In the embodiment shown in FIG. 1F, a first electrical connector 174a (e.g., a first electrical receptacle) and a second electrical connector 174b (e.g., a second electrical receptacle) can be positioned on the trailer T and configured to electrically couple to respective connectors (not shown) positioned on the loading dock LD. The first and second electrical connectors 174a and 174b can be configured with mounting systems allowing various degrees of freedom (e.g., lateral, rotational, etc.) for self-aligning with the respective connectors on the loading dock LD so that the respective connectors can be automatically connected as the trailer T backs up to the loading dock LD. For example, in some embodiments, the loading dock LD can include connectors mounted to the face of the loading dock LD at approximately the same positions (e.g., approximately the same vertical and lateral positions) as the corresponding first and second electrical connectors 174a and 174b are located on the trailer T. In some embodiments, the connectors on the loading dock LD can be stationary, or they can be guided by a guidance system (e.g., a sensor, a camera, etc.) at the loading dock LD. In other embodiments, the connectors at the loading dock LD can include an alignment feature (e.g., a ramp, a cone, one or more rollers, etc.) to engage a corresponding alignment feature on the trailer T and ensure reliable connection between the corresponding connectors when the trailer T backs up to the loading dock LD. In some embodiments, the first electrical connector 174a can be configured for a different type of power delivery (AC/DC), voltage, amperage, current protection threshold, and/or have other differing characteristic from the configuration of the second electrical receptacle 174b, similar to the embodiments of FIG. 1E described above. The power connection system embodiments described herein can have any combination of power delivery components, and can include any suitable combination of contact patches and/or connectors.

Figure 2A:
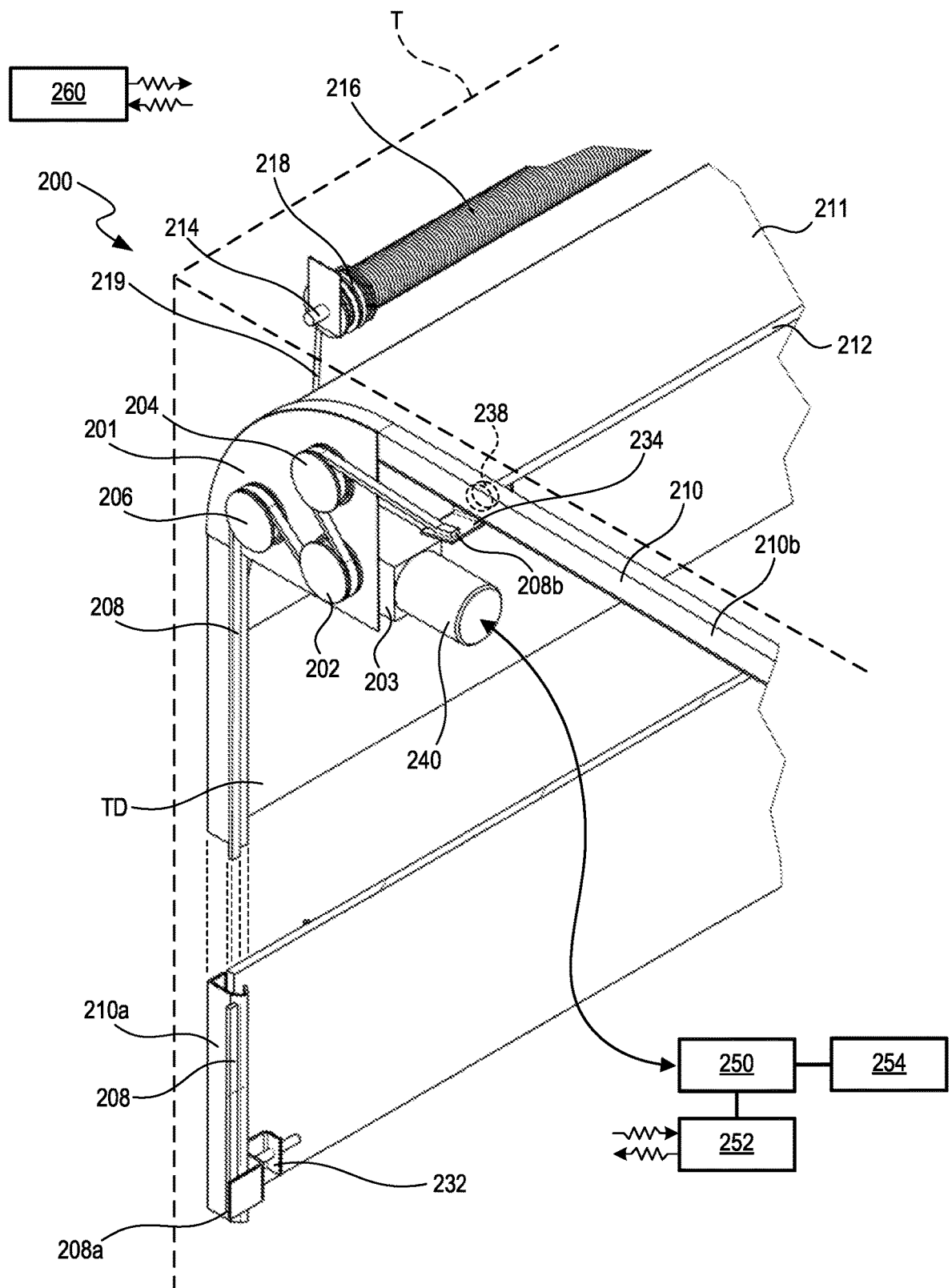
FIGS. 2A and 2B are isometric and side elevation views, respectively, illustrating an automated trailer door system configured in accordance with other embodiments of the present technology.
Figure 2B:
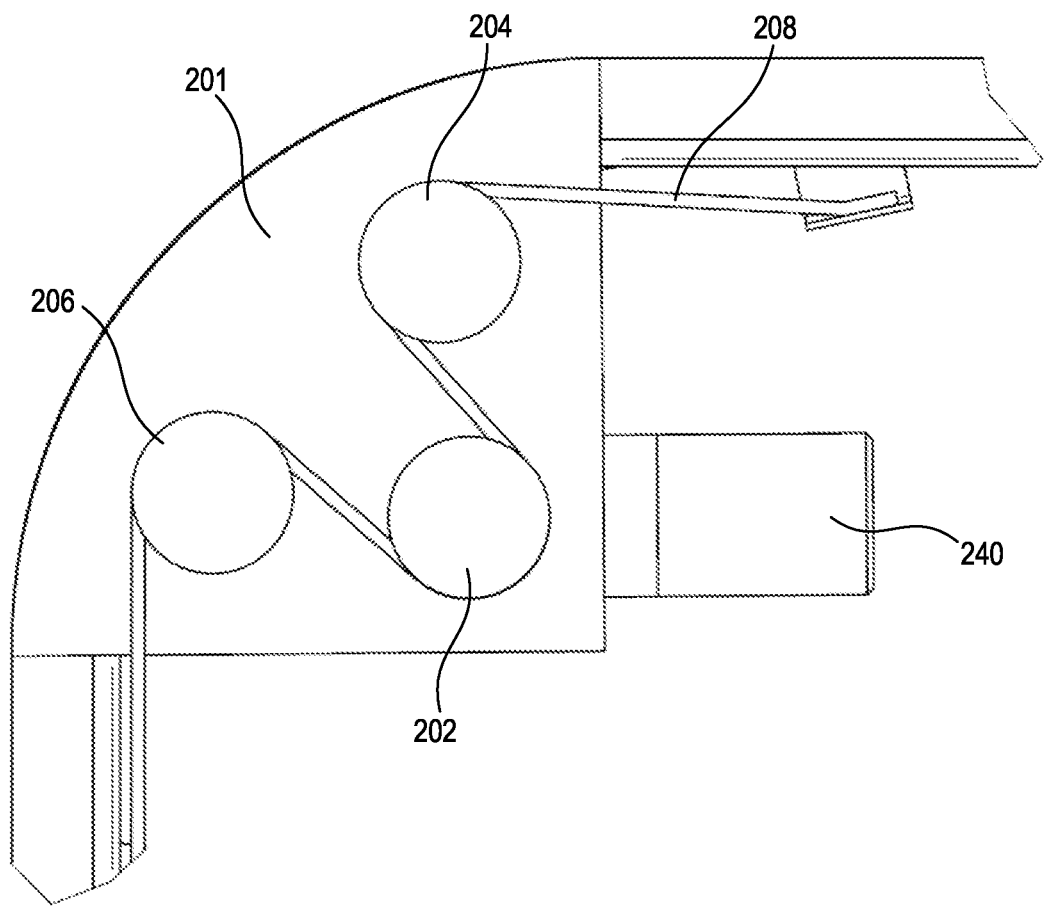

FIGS. 2A and 2B are isometric and side elevation views, respectively, illustrating an automated trailer door system 200 ("system 200") configured in accordance with other embodiments of the present technology. The system 200 includes components associated with a trailer T that can automate the opening and/or closing of a trailer door TD, e.g., by a signal initiated by the driver, from an operator at a loading dock, from a loading dock control system, etc. (e.g., as described above with reference to the system 100 of FIG. 1A). The system 200 includes a guide track 210 with a lower guide track portion 210*a* in a generally vertical orientation for retaining the trailer door TD in the closed position, and an upper guide track portion 210*b* in a generally horizontal orientation for retaining the trailer door TD in the open position. In some embodiments, the upper track portion 210*b* supports the trailer door TD in a horizontal position so that the trailer door TD does not tend to move from the open position toward the closed position without actuation by the system 200 or manual input. Although only one guide track 210 is shown for purposes of illustration, it will be understood that the system 200 further includes a second guide track on the opposite side of the trailer door TD, which can be similar to or the same as the guide track 112 shown in FIG. 1A. The system 200 can further include a counterbalance system with a shaft 214, a spring 216, and a drum 218 with a cable 219 operably coupled to the trailer door TD to aid in the opening and/or closing force of the trailer door TD.

In some embodiments, the system 200 includes a mounting plate 201, a driven pulley/gear 202 operably coupled to an electric motor 240, a first idler pulley/gear 204, and a second idler pulley/gear 206. The output shaft (not shown) of the motor 240 can be positioned at a right angle to the rotational axis of the gear 202 and operably coupled to an axle of the pulley/gear 202 by means of a bevel gear (e.g. a right-angle gearbox 203 with intersecting axes bevel gears, etc.) or any other suitable system, such that rotation of the motor output shaft causes corresponding rotation of the pulley/gear 202. As shown in FIG. 2B, the motor 240 can be positioned in a horizontal orientation, a vertical orientation (not shown), or any other suitable orientation for performance, access, packaging, etc. The pulleys/gears 202, 204, and 206 are configured to interface with a flexible drive member 208 (e.g., a ribbed or toothed belt, poly belt, chain, cable, etc.), with the drive gear 202 rotating to drive the flexible drive member 208, and the idler pulleys/gears 204 and 206 interfacing with the flexible drive member 208 to change direction of the flexible drive member 208 and to ensure the flexible drive member 208 remains under suitable tension during operation. One or more of the pulleys/gears 202, 204, and 206 can be toothed to reduce slippage with respect to the flexible drive member 208. The flexible drive member 208 has a first end portion 208*a* that can be coupled to a lower portion of the trailer door TD by a first door bracket 232, and a second end portion 208*b* that can be coupled to an upper portion of the trailer door TD by a second door bracket 234. The second door bracket 234 can be attached to an end portion of a crossover member 212, and an upper roller 238 can be rotatably coupled to the end portion of the crossover member 212 for travelling within the guide track 210. The crossover member 212 is configured to provide support for the upper roller 238 as the trailer door TD moves between the open and closed positions. The second door bracket 234 may be positioned separated from the uppermost panel 211 of the trailer door TD so that the second door bracket 234 does not interfere with the mounting plate 201 or the first idler pulley/gear 204 and the upper roller 238 is positioned within the upper guide track portion 210*b* when the trailer door TD is in the closed position.

In a similar manner to the system 100 described above, the motor 240 of the system 200 can be controlled by a controller 250 (e.g., a processor, PLC, or other suitable processing device that executes computer readable instructions, etc.) that receives a control signal from e.g., an operator through a user interface on the tractor and/or trailer, a loading dock control system, and/or a loading dock operator through a user interface at the loading dock or an AGV, etc. In this regard, the controller 250 can include an antenna 252 for receiving a wireless signal from a transmitter 260, e.g., on the loading dock control system, a remote controller, etc. and transmitting status of the trailer door TD position, faults of the system 200, battery level, or other suitable information related to the system 200 to the trailer, tractor, loading dock control system 260, AGV, etc. The controller 250 can be configured to require that the control signal be authenticated prior to the controller 250 controlling the motor 240, e.g., by verifying an authentication level at the user interface after the user inputs a PIN, code, magnetic card, etc. The system 200 may also include a suitable power source 254 to operate the motor 240 and open/close the trailer door TD. In some embodiments, the power source 254 can include a battery positioned in a suitable location on the trailer that can be charged by the tractor power system, regenerative braking, solar, etc., or can be charged by a power connection at the loading dock (e.g., with a contact patch drawing power from the loading dock, such as the system described above with respect to FIGS. 1C-1F, on the trailer bar interfacing the trailer restraint, etc.). In some embodiments, the system 200 can be configured to operate in response to signals from the loading dock control system 260 for actuation of the trailer door TD. In such embodiments, the control system can be configured to send and receive various signals related to status of the trailer door TD (e.g., open or closed, faults, battery level, etc.). The signals can be transmitted via wired or wireless connections, and may be a portion of a loading dock workflow or sequence (automated or manual). In some embodiments, the system 200 may also be operable manually by a physical switch (e.g., a button or switch on the trailer, tractor, etc.). In some embodiments, the loading dock control system 260 can communicate with an AGV and/or forklift to verify trailer door open/closed/fault status from the controller 250 and communicate such status to the loading dock control system 260.

Figure 3A:
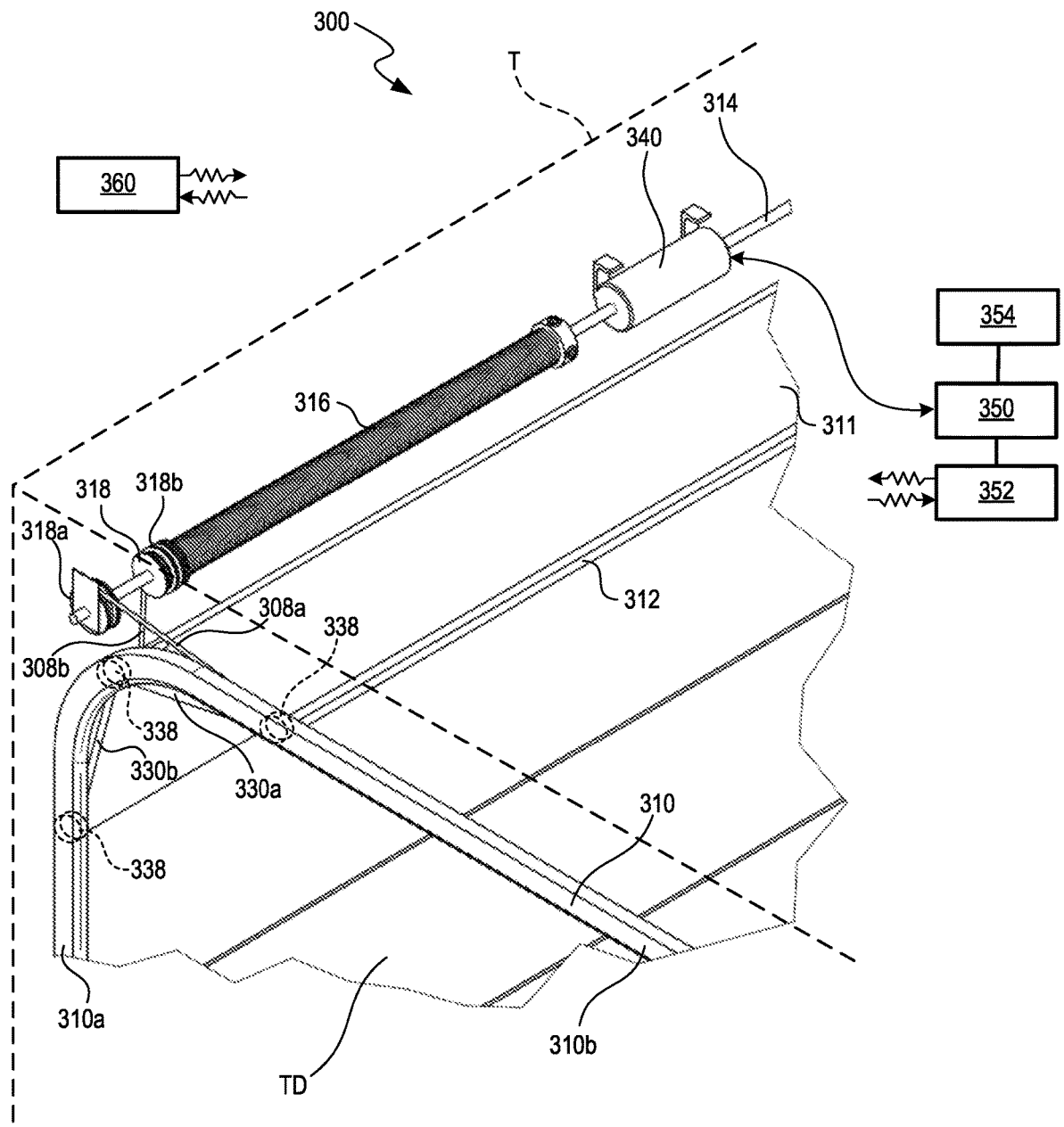
FIGS. 3A-3C are isometric, side elevation, and cross-sectional detail views, respectively, illustrating an automated trailer door system configured in accordance with further embodiments of the present technology.
Figure 3B:
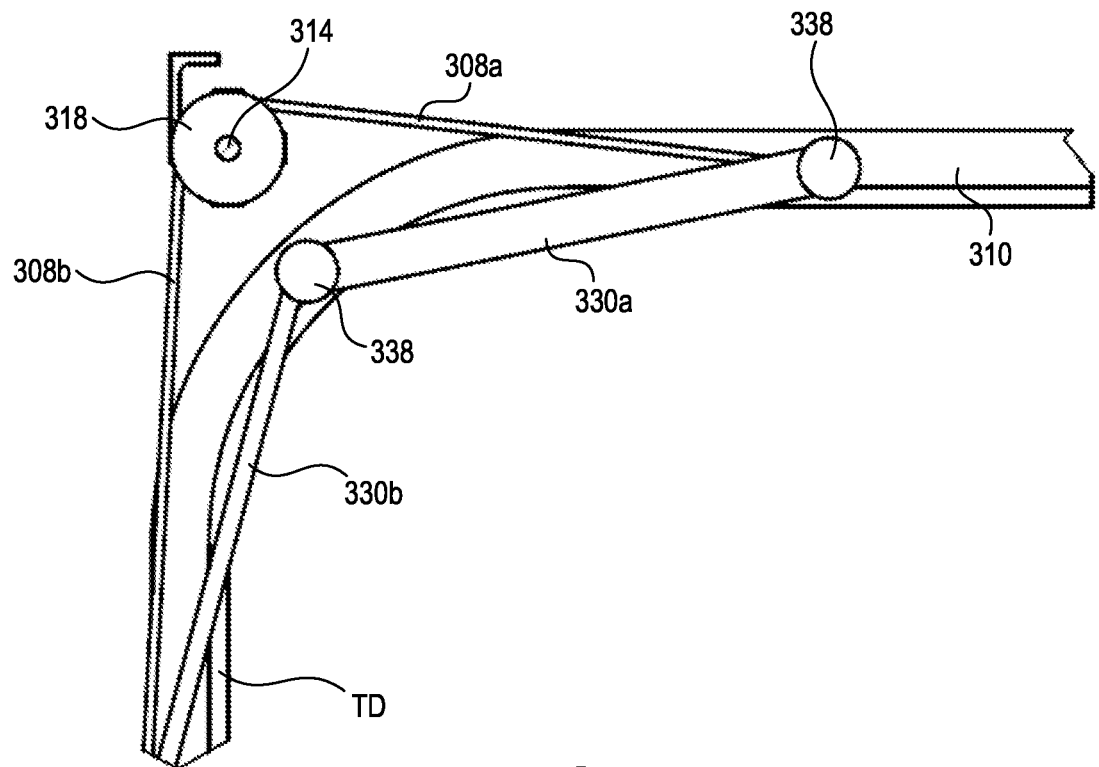
Figure 3C:
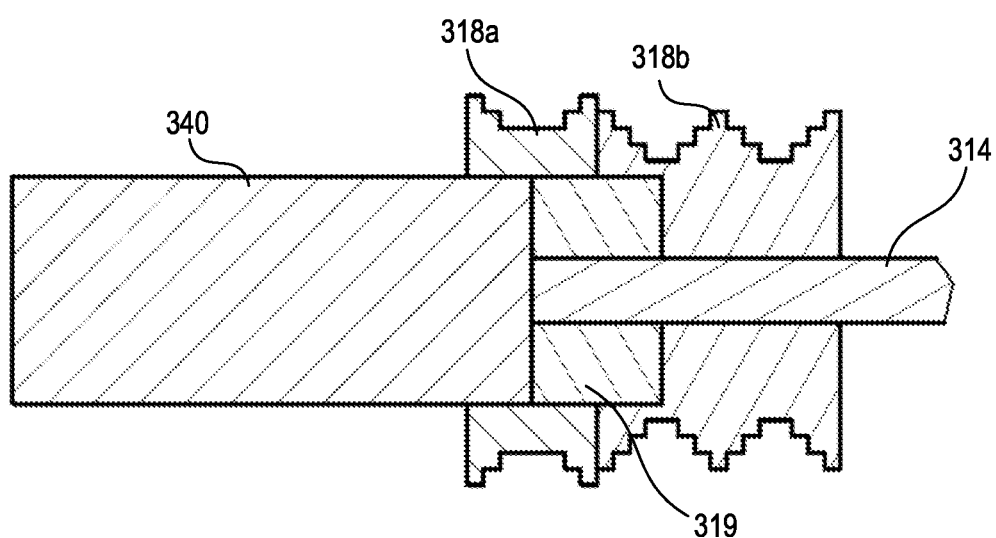

FIGS. 3A-3C are isometric, side elevation, and detail cross-sectional views, respectively, illustrating an automated trailer door system 300 ("system 300") configured in accordance with other embodiments of the present technology. FIG. 3A shows a motor location central to the counterbalance system and FIG. 3C shows a motor location partially inside a drum assembly, as will be described below. The system 300 includes components associated with a trailer that can automate the opening and/or closing of a trailer door TD, e.g., by a signal initiated by the driver, from an operator at a loading dock, from a loading dock control system, etc. The system 300 includes a guide track 310 with a lower guide track portion 310*a* in a generally vertical orientation for retaining the sides of the trailer door TD in the closed position, and an upper guide track portion 310*b* in a generally horizontal orientation for retaining the sides of the trailer door TD in the open position. In some embodiments, the upper track portions 310*b* supports the trailer door TD in a horizontal position so that the trailer door TD does not tend to move from the open position toward the closed position without actuation by the system 300 or manual input. Although only one guide track 310 is shown for purposes of illustration, it will be understood that the system 300 further includes a second guide track on the opposite side of the trailer door TD, which can be similar to or the same as the guide track 112 shown in FIG. 1A. The system 300 can include first and second door arms 330a and 330b, respectively, each rotatably coupled to rollers 338 on each end, with the rollers 338 configured to travel within the guide track 310. In some embodiments, at least some of the rollers 338 coupled to the first door arm 330a can be supported by a crossover tube 312 positioned away from the top panel of the trailer door TD. The rollers 338 can be positioned away from the uppermost panel 311 of the trailer door TD so that the upper roller 338 is within the upper guide track portion 310b when the trailer door TD is in the closed position.

The system 300 further includes a counterbalance system with a shaft 314, a spring 316, a drum assembly 318, and first and second cables 308a and 308b to aid in the opening and/or closing force of the trailer door TD. The shaft 314 can include a through-shaft motor 340 (e.g., an electric motor) positioned at an intermediate axial position (or at other axial positions) along the shaft 314 and configured to rotate the shaft 314 to open and close the trailer door. The through-shaft motor 340 provides rotation to the drum assembly 318, having a first drum portion 318a operably associated with the first cable 308a, and a second drum portion 318b operably associated with the second cable 308b. More specifically, in some embodiments the first cable 308a can be wound about the first drum portion 318a, coupled to the first door arm 330a, and configured to move the trailer door TD from the open position to the closed position when pulled in tension by operation of the motor 340. The second cable 308b can be wound about the second drum portion 318b, coupled to a lower portion of the trailer door TD, and configured to move the trailer door TD from the closed position to the open position when pulled in tension by operation of the motor 340. The first and second drum portions 318a and 318b may include a clutch system 319 (e.g., a sprag clutch, see FIG. 3C, showing another embodiment of the position of the through-shaft motor 340), to neutralize any differential length in the cables 308a and 308b as the trailer door TD moves between the open and closed positions. In use, as the first cable 308a is wound onto the first drum portion 318a, pulling on the first door arm 330a to close the door, the second cable 308b is payed out from the second drum portion 318b and extends along the lower guide track portion 310a with the lower portion of the trailer door TD. Alternatively, as the second cable 308b is wound onto the second drum portion 318b, pulling on the lower portion of the trailer door TD to open the door, the first cable 308a is payed out from the first drum portion 318a and extends with the first door arm 330a along the upper guide track portion 310b.

In a similar manner to the systems 100 and 200 described above, the motor 340 of the system 300 can be controlled by a controller 350 (e.g., a processor (PLC) or other suitable processing device, such as a processor/chip that executes computer readable instructions, etc.) that receives a control signal from the trailer, tractor, loading dock, AGV, manual switch, etc. In this regard, the controller 350 can include an antenna 352 for receiving a wireless signal from a loading dock control system 360 and transmitting status of the trailer door TD position, faults of the system 300, battery level, or other suitable information related to the system 300 to the trailer, tractor, loading dock control system 360, AGV, etc. The controller 350 can be configured to require that the control signal be authenticated prior to the controller 350 controlling the motor 340, e.g., by verifying an authentication level at the user interface after the user inputs a PIN, code, magnetic card, etc. As shown in FIG. 3C, in other embodiments, the motor 340 can be positioned near or partially inside the first and second drum portions 318a and 318b and can include a clutch system 319 (e.g., a friction clutch, centrifugal clutch, electric clutch, etc.) that selectively transfers rotation from the motor to one or both of the drum portions 318a and 318b.

The system 300 may also include suitable power source 354 to operate the motor 340 and open/close the trailer door TD. In some embodiments, the power source 354 can include a battery positioned in a suitable location on the trailer that can be charged by the tractor power system, regenerative braking, solar, etc., or can be charged by a power connection at the loading dock (e.g., with a contact patch drawing power from the loading dock, such as the system described above with respect to FIGS. 1C-1F, on the trailer bar interfacing the trailer restraint, by wireless charging via electromagnetic induction, etc.). In some embodiments, the system 300 can be configured to operate in response to signals from the loading dock control system 360 for actuation of the automated powered trailer door. In such embodiments, the control system can be configured to send and receive various signals related to status of the trailer door TD (e.g., open or closed, faults, etc.). The signals can be transmitted via wired or wireless connections, and may be a portion of a loading dock workflow or sequence (automated or manual). In some embodiments, the system 300 may also be operable manually by a physical switch (e.g., a button on the trailer, tractor, etc.). In some embodiments, the loading dock control system 360 can communicate with an AGV and/or forklift to verify trailer door open/closed/fault status from the controller 350 and communicate such status to the loading dock control system 360.

Figure 4A:
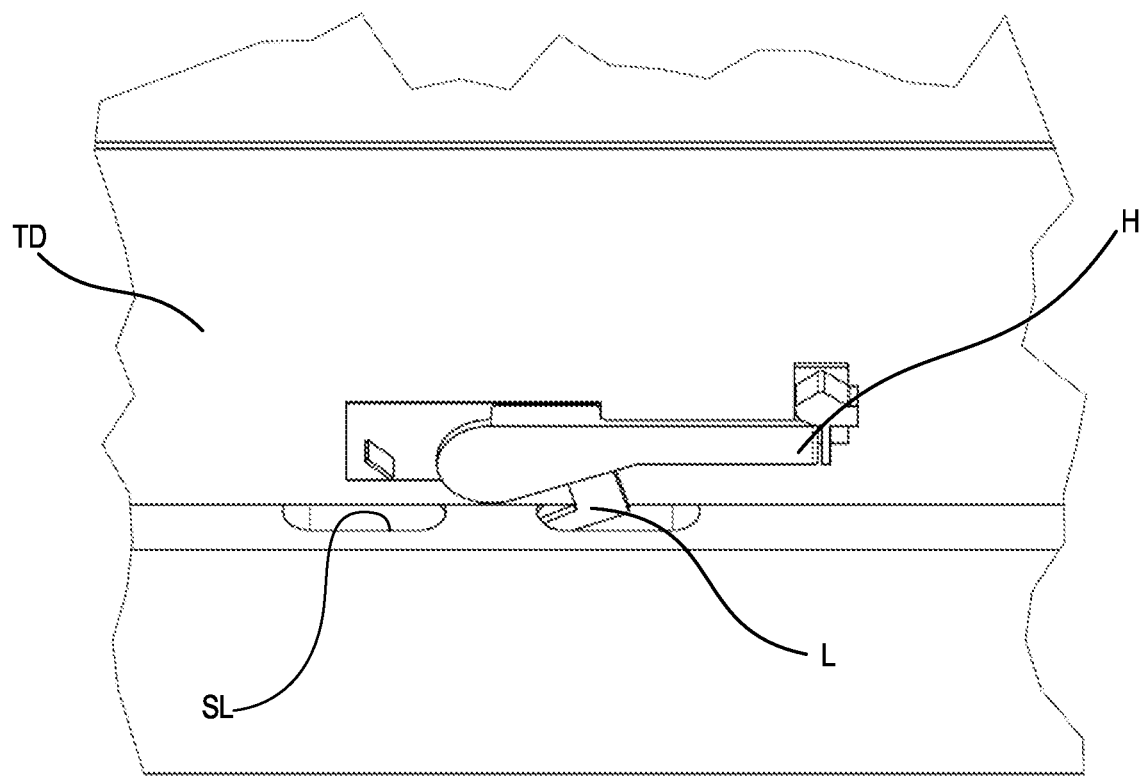
FIG. 4A is a perspective view illustrating a conventional trailer door latch system.
Figure 4B:
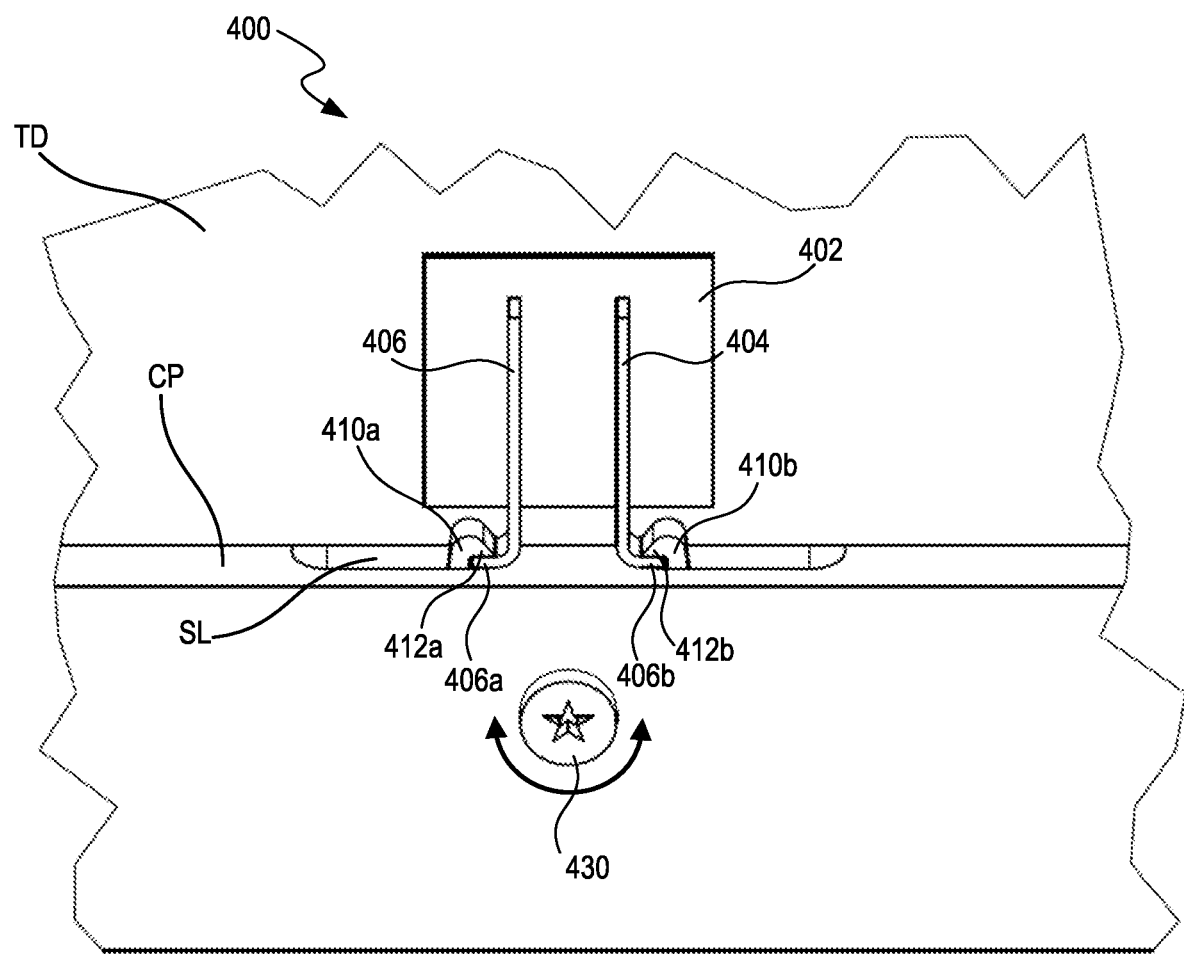
FIGS. 4B and 4C are perspective and cross-sectional elevation views, respectively, illustrating an automated trailer door latch system configured in accordance with embodiments of the present technology.

FIG. 4A illustrates a conventional latch system for use with a trailer door TD, the system having a handle H for manually actuating a latch L, and slots SL for receiving a hook portion of the latch L to prevent opening of the trailer door TD. FIGS. 4B-4E illustrate an automated trailer door latch system 400 ("system 400") configured in accordance with embodiments of the present technology. Components of the system 400 can be retrofitted to existing trailer doors and/or trailers or can be installed on newly manufactured trailer doors and/or trailers. Referring to FIG. 4B, the system 400 includes a striker plate 402 having a first flange 404 with a first locking portion 404a and a second flange 406 with a second locking portion 406a. The first and second locking portions 404a and 406a can be configured for positioning adjacent the slots SL when the trailer door TD is in the closed position. The striker plate and flanges 404 and 406 are movable with the trailer door TD during opening and closing.

Figure 4C:
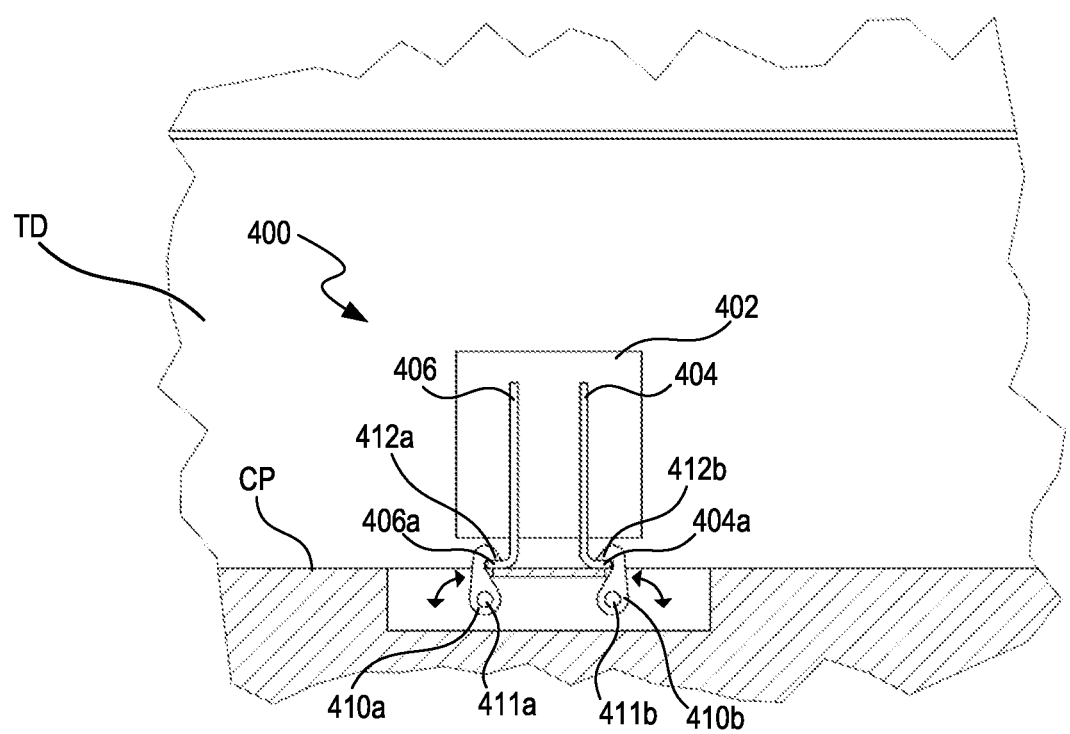

Referring to FIGS. 4B and 4C together, the system 400 further includes a first rotatable locking arm 410a and a second rotatable locking arm 410b, configured to rotate (e.g., simultaneously) in opposite directions from each other about corresponding pivot shafts 411a and 411b. The rotatable locking arms 410a and 410b are positioned such that corresponding hook portions 412a and 412b can be selectively rotated from a stowed position below (or at least partially below) the lateral surface of the catch plate CP, to a deployed position as shown in FIG. 4B, extending through the slots SL in the catch plate CP and engaging the locking portions 404a and 406a, respectively, of the flanges 404 and 406 to secure the trailer door TD in the closed position. The locking arms 410a and 410b can be rotated individually or in unison by any suitable system, such as by a motorized system, to automate securement of the trailer door TD. For example, as shown in FIG. 4B, an interface feature 430 (e.g., a socket, hex, slot, etc.) can be operably coupled to either or both of the locking arms 410a and 410b and positioned in a component (e.g., a surface of the bumper, floor, etc.) of the trailer T such that rotation of the interface feature 430 can engage and disengage the system 400 to externally lock and unlock the trailer door TD. These embodiments can be used with an external drive interface (such as a ratchet, driver, or automated rotational system) for locking/unlocking the trailer door TD.

Figure 4D:
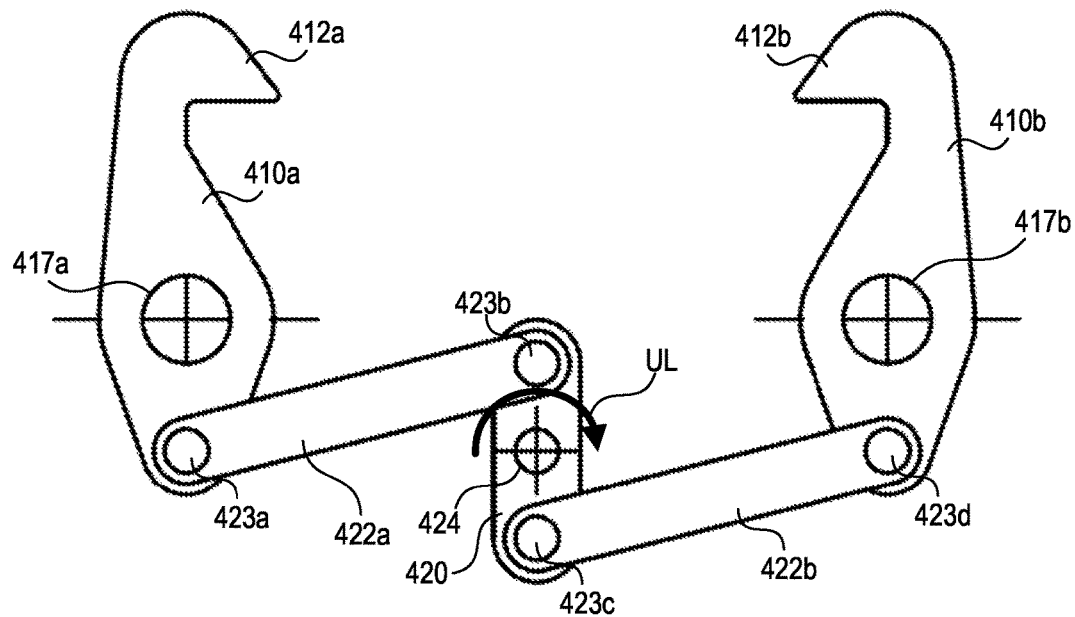
FIGS. 4D and 4E are detail elevation views illustrating components of the automated trailer door latch system of FIGS. 4B and 4C.
Figure 4E:
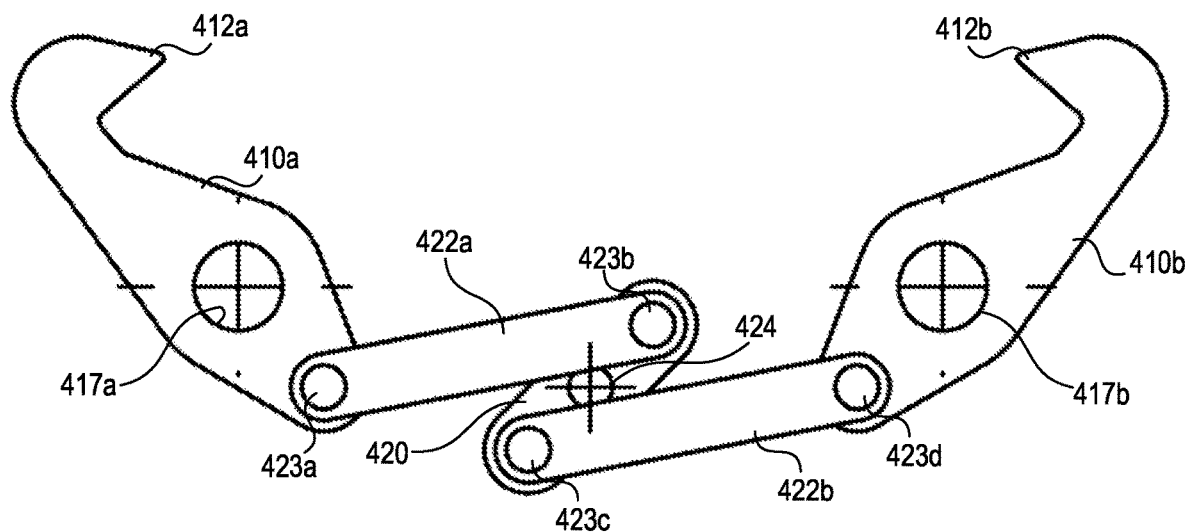

As shown in FIGS. 4D and 4E, for example, the locking arms 410a and 410b are linked to a bell crank 420 via a first link 422a having pins 423a and 423b and a second link 422b having pins 423c and 423d. In this embodiment, the bell crank 420 is an over-center link, which rotates the locking arms 410a and 410b in opposite directions about their corresponding pivot shafts 417a and 417b as the bell crank 420 is rotated about its pivot shaft 424 (e.g., by the interface feature 430 operably coupled to the bell crank 420). In the locked configuration shown in FIG. 4D, the bell crank 420 can be rotated in a clockwise direction of arrow UL to the unlocked configuration shown in FIG. 4E. In some embodiments, the bell crank 420 and/or the locking arms 410a and 410b are rotated by one or more motors (not shown) positioned on the trailer and operably coupled to the corresponding pivot shafts 417a and 417b, e.g., by a signal from the loading dock, the tractor/trailer/truck driver, a manual signal by another operator, etc. In some embodiments, only a single rotatable locking arm is used with the system 400.

Figure 5:
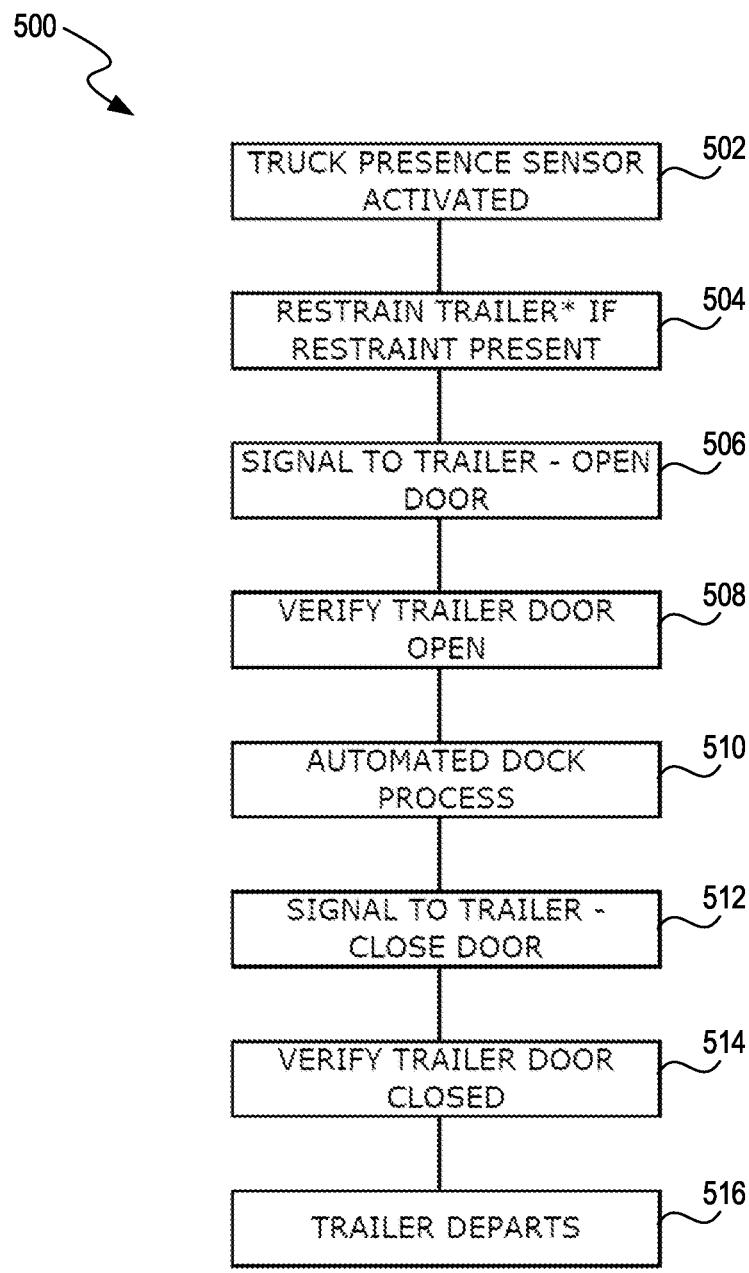
FIGS. 5-7 are flowcharts of loading dock operational steps configured in accordance with embodiments of the present technology.
Figure 6:
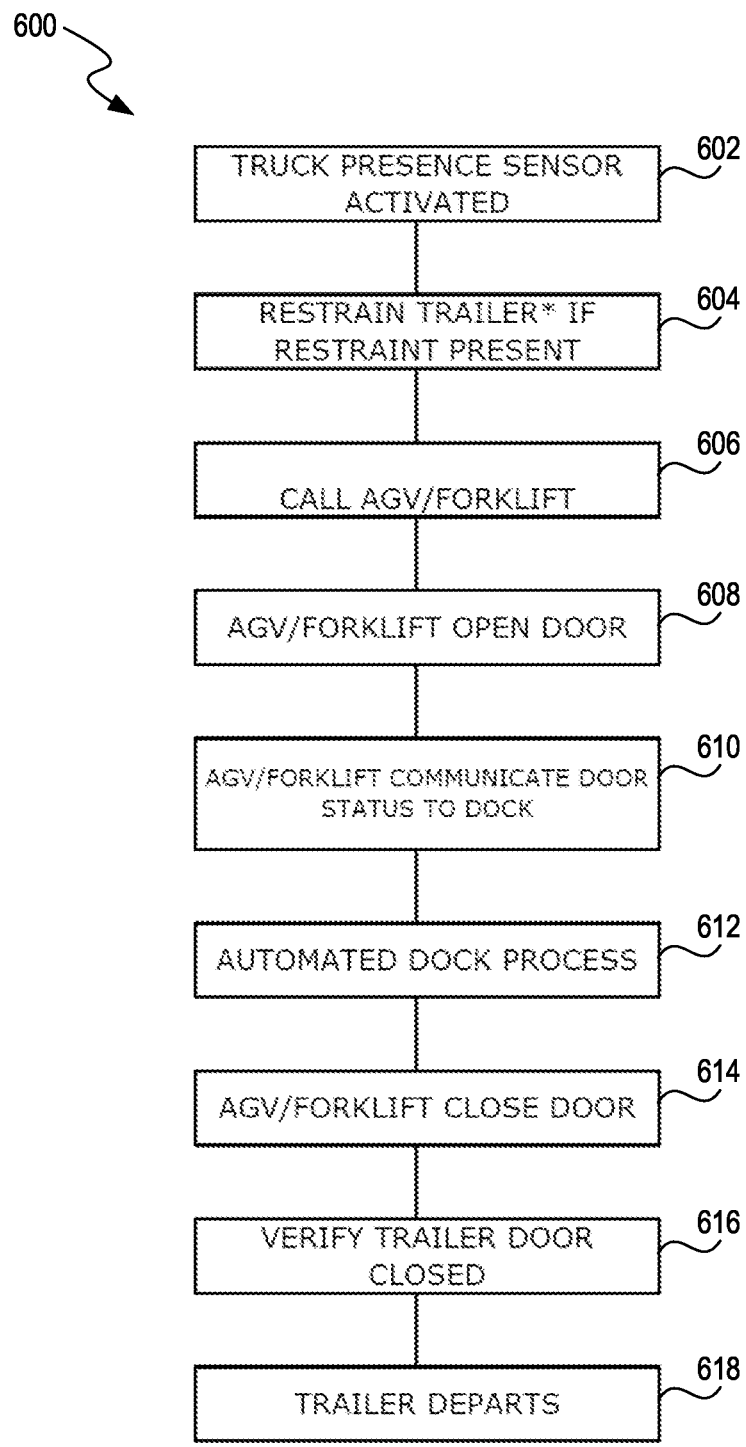
Figure 7:
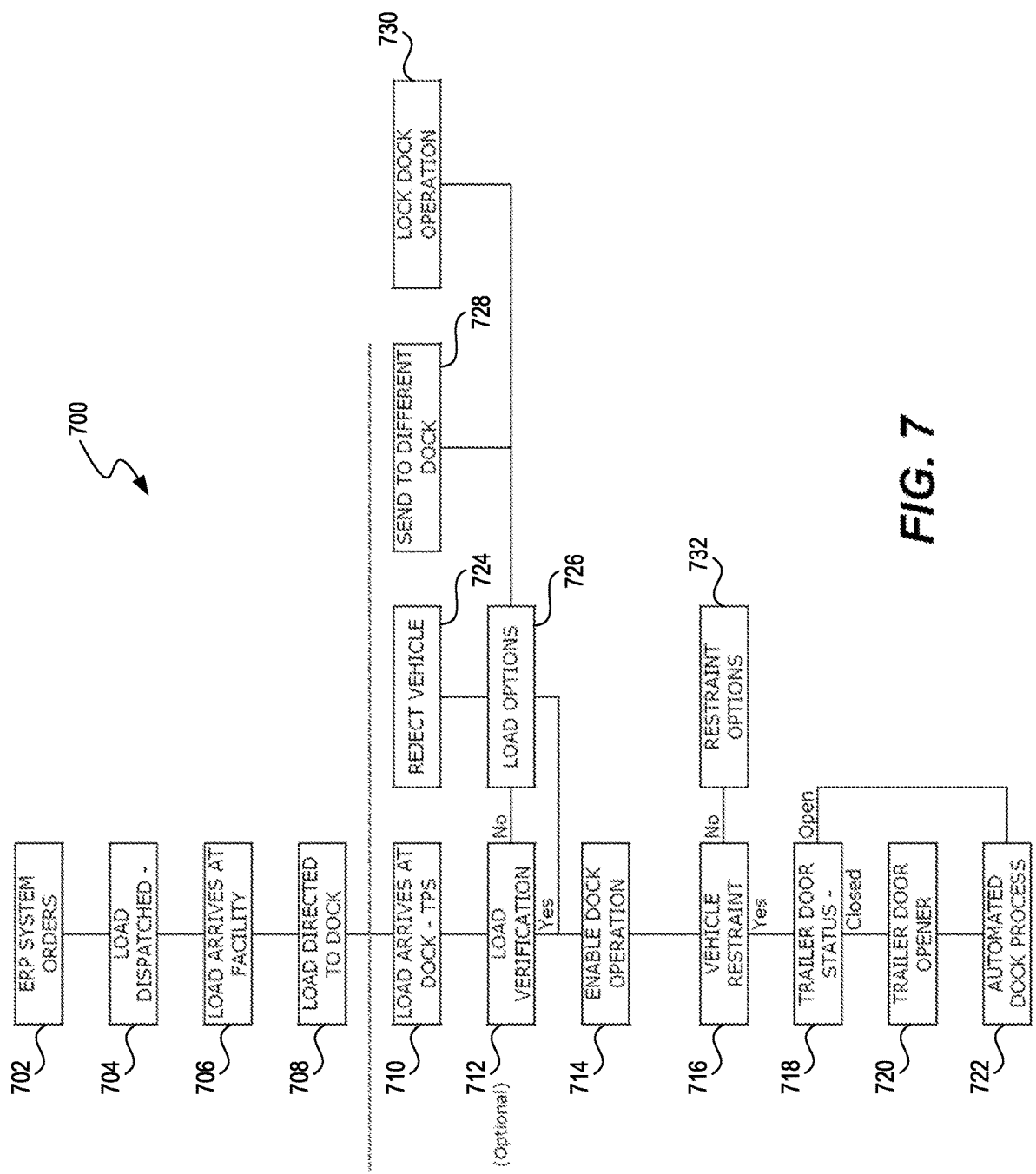

FIGS. 5-7 show representative loading dock operational flowcharts 500, 600, and 700, respectively, for use with the systems 100-400 described above in accordance with embodiments of the present technology. Turning first to FIG. 5, the flowchart 500 begins in block 502 when a truck presence sensor (e.g., a pressure sensor, optical sensor, etc.) senses the presence of a truck at a loading dock. The truck presence sensor can be positioned on the parking surface in front of the loading dock, on a loading dock door, a wall of the loading dock, or any other suitable surface. In response to detecting the presence of a trailer by the truck presence sensor, the loading dock control system, (e.g. the loading dock control system 160, 260 or 360 described above), can send a signal to initiate operation of a trailer restraint in block 504 if a restraint is present. The trailer restraint can be any suitable restraint for preventing movement of the trailer during loading/unloading. Next, in block 506, the loading dock control system sends a signal to a controller on the trailer (e.g., the controller 150, 250 or 350 described above) to open the trailer door using any of the systems 100, 200, and/or 300. In trailers having the system 400, the loading dock control system may first send a signal to unlock the trailer door prior to opening the trailer door. The signal can be a wireless signal, or can be a wired signal through contacts on the trailer. Next, and block 508, the loading dock control system verifies that the trailer door is open, e.g., by visual confirmation, a signal from the controller on the trailer, a signal from a door sensor, a signal from an AGV, etc. Once the loading dock control system verifies that the trailer door is open, in block 510, an automated dock process may be initiated (e.g., turning on one or more lights, deploying a door seal, leveling the dock, loading/unloading the trailer, etc.). After the automated dock process concludes (as indicated by, e.g., input to the control system from an operator), in block 512, the loading dock control system can send a signal to the controller on the trailer to close the trailer door. Next, in block 514, the loading dock control system verifies that the trailer door is closed, e.g., by visual confirmation, a signal from the controller on the trailer, a signal from a door sensor, a signal from an AGV, etc. Next, in block 516, the trailer restraint may be released such that the trailer can depart.

FIG. 6 shows a loading dock operation flowchart 600 including operations of the powered trailer door systems 100-400 described herein. The flowchart 600 begins in block 602 when a truck presence sensor senses the presence of a truck at a loading dock. The truck presence sensor can be positioned on a loading dock door, a wall of the loading dock, or any other suitable surface. The presence of a trailer detected by the truck presence sensor can cause the loading dock control system to initiate engagement of a trailer restraint in block 604, if a trailer restraint is present. The trailer restraint can be any suitable restraint for preventing movement of the trailer during loading/unloading. Next, in block 606, the loading dock control system, e.g. as described above, sends a signal (e.g., a wireless signal) to call an AGV, and then in block 608, sends a signal to the AGV that causes the AGV to send a signal (e.g., a wireless signal) to the trailer to open the trailer door using any of the systems 100, 200 and/or 300. In trailers having the system 400, the AGV may first send a signal to unlock the trailer door prior to opening the trailer door. The signal can be wireless, or can be a wired signal through contacts on the trailer. Next, and block 610, the AGV verifies that the trailer door is open, e.g., by visual confirmation, a signal from the controller on the trailer, etc. and communicates the door status to the loading dock control system. Once the loading dock control system verifies that the trailer door is open, in block 612, an automated dock process may be initiated (e.g., turning on one or more lights, deploying a door seal, leveling the dock, etc.). After the automated dock process concludes, in block 614, the AGV can send a signal (e.g., a wireless signal) to the controller on the trailer to close the trailer door. Next, in block 616, the loading dock control system verifies that the trailer door is closed, e.g., by visual confirmation, a signal from the controller on the trailer, an AGV, etc. Next, in block 618, the trailer restraint may be released such that the trailer can depart.

FIG. 7 shows a loading dock operation flowchart 700 including operations of the powered trailer door systems 100-400 described herein, where an identification system, such as the systems described in U.S. Provisional App. No. 63/284,501, filed Nov. 30, 2021, and titled TRAILER VALIDATION SYSTEMS, which is incorporated by reference herein in its entirety, can be used with the flowchart 700. The flowchart 700 begins in block 702 where an Enterprise Resource Planning (ERP) system orders items delivered by a trailer. Next, in block 704, the load is dispatched and in block 706, the load arrives at the facility. In block 708, the load is directed to a loading dock and in block 710 the load arrives at the loading dock. Next, in optional block 712, the load is verified, e.g., by any suitable load verification signal, including the identification system incorporated by reference herein. If the load is unverified, in block 726, the loading dock control system selects load options, including rejecting the vehicle at block 724, sending the vehicle to a different dock at block 728, and locking operation of the loading dock at block 730. Alternatively, if the load is verified, in block 714, the loading dock operation is enabled. Next, in block 716, a vehicle restraint can be applied to the trailer to prevent movement of the trailer during loading/unloading. If the vehicle restraint is not present, in block 732, restraint options can be available to the loading dock control system, e.g., wheel chocks, manual restraint, etc. Once the restraint is verified, the loading dock control system queries the trailer door status in block 718, e.g., whether the trailer door is open or closed, by visual confirmation, a signal from the controller on the trailer, an AGV, etc. If the trailer door is closed, the loading dock control system sends a signal to the trailer in block 720, using any method described above, to open the trailer door using any of systems 100-400 described herein. If the trailer door is open at the query in status of block 718, or after opening in block 720, the automated dock process is initiated in block 722. Although not shown, the flowchart 700 may further include sending a signal to close the trailer door and releasing the trailer restraint so that the trailer can depart from the loading dock.

SELECTED EXAMPLES

1. A powered trailer door operating system for use with a trailer door, comprising:
    a guide track having a lower guide track portion configured to position the trailer door at a closed position and an upper guide track portion configured to position the trailer door at an open position;
    a drive support coupled to the upper guide track portion, the drive support having a central cavity and a slot extending through the drive support into the central cavity, the slot positioned longitudinally along at least a portion of the drive support;
    a drive shaft positioned within the central cavity; and
    a carriage slidingly coupled to the drive support and operably coupled to the trailer door, wherein the carriage is operably engaged with the drive shaft through the slot such that rotation of the drive shaft causes the carriage to translate along the drive support, thereby moving the trailer door between the closed position and the open position.

2. The powered trailer door operating system of claim 1, wherein the drive shaft comprises helical screw-type threads, and wherein the carriage further comprises an engagement member having teeth configured to operably engage the helical screw-type threads.

3. The powered trailer door operating system of claim 1, further comprising a door arm pivotably coupled between the carriage and the trailer door.

4. The powered trailer door operating system of claim 1, wherein the drive support includes a semi-circular wall portion at least partially surrounding the central cavity, and wherein the carriage has an engagement portion configured to slidingly contact the semi-circular wall portion of the drive support.

5. The powered trailer door operating system of claim 1, further comprising a motor configured to rotate the drive shaft.

6. The powered trailer door operating system of claim 5, wherein the motor is an in-line motor.

7. The powered trailer door operating system of claim 5, wherein the motor has an output shaft positioned at an angle relative to the drive shaft, and wherein the motor engages the drive shaft by means of a bevel gear.

8. The powered trailer door operating system of claim 5, further comprising a controller for controlling the motor, wherein the controller is configured to receive a signal from:
    an operator via a user interface on a tractor and/or a trailer,
    a loading dock control system,
    a loading dock operator via a user interface at the loading dock, or
    an Automated Guided Vehicle (AGV), and
    wherein the controller is further configured to execute computer readable instructions that cause the trailer door to move between the closed and open positions in response to the signal.

9. The powered trailer door operating system of claim 8, wherein:
    the powered trailer door operating system is operably coupled to the trailer;
    the trailer comprises a first trailer contact patch and a second trailer contact patch positioned on an external surface of the trailer and electrically coupled to the controller;
    the first trailer contact patch has a positive polarity and is configured to contact a positive polarity loading dock contact patch when the trailer is positioned at the loading dock; and
    the second trailer contact patch has a negative polarity and is configured to contact a negative polarity loading dock contact patch when the trailer is positioned at the loading dock.

10. The powered trailer door operating system of claim 9, wherein the positive and negative polarity loading dock contact patches are configured to provide electrical power to the motor for moving the trailer door between the closed and open positions.

11. The powered trailer door operating system of claim 9, wherein the positive and negative polarity loading dock contact patches include flexible portions configured to maintain contact with the first and second trailer contact patches when the trailer is positioned proximate the loading dock and/or when the trailer is laterally misaligned with the loading dock.

12. The powered trailer door operating system of claim 9, wherein the trailer further comprises a grounding contact patch configured to contact a grounding member of the loading dock.

13. A powered trailer door operating system for use with a trailer door, comprising:
    a guide track having a lower guide track portion configured to position the trailer door at a closed position and an upper guide track portion configured to position the trailer door at an open position;
    a driven pulley coupled to the guide track; and
    a flexible drive member operably engaged with the driven pulley, the flexible drive member having a first end portion coupled to a lower portion of the trailer door and a second end portion coupled to an upper portion of the trailer door,
    wherein rotation of the driven pulley translates the flexible drive member to move the trailer door between the closed position and the open position.

14. The powered trailer door operating system of claim 13, further comprising:
    a mounting plate positioned between the driven pulley and the guide track;
    a first idler pulley coupled to the mounting plate and positioned to operably interact with the flexible drive member between the driven pulley and the first end portion; and
    a second idler pulley coupled to the mounting plate and positioned to operably interact with the flexible drive member between the driven pulley and the second end portion.

15. The powered trailer door operating system of claim 13, further comprising a crossover member having an upper roller operably engaged with the guide track, and wherein the second end portion is coupled to the upper portion of the trailer door via the crossover member.

16. The powered trailer door operating system of claim 13, further comprising a motor operably coupled to the driven pulley and configured to rotate the driven pulley to translate the flexible drive member.

17. The powered trailer door operating system of claim 16, further comprising a controller for controlling the motor, wherein the controller is configured to receive a signal from:
   an operator via a user interface on a tractor and/or a trailer,
   a loading dock control system,
   a loading dock operator via a user interface at the loading dock, or
   an Automated Guided Vehicle (AGV), and
   wherein the controller is further configured to execute computer readable instructions that cause the trailer door to move between the closed and open positions in response to the signal.

18. The powered trailer door operating system of claim 17, wherein:
   the powered trailer door operating system is operably coupled to the trailer;
   the trailer comprises a first trailer contact patch and a second trailer contact patch positioned on an external surface of the trailer and electrically coupled to the controller;
   the first trailer contact patch has a positive polarity and is configured to contact a positive polarity loading dock contact patch when the trailer is positioned at the loading dock; and
   the second trailer contact patch has a negative polarity and is configured to contact a negative polarity loading dock contact patch when the trailer is positioned at the loading dock.

19. A powered trailer door operating system for use with a trailer door, comprising:
   a guide track having a lower guide track portion configured to position the trailer door at a closed position and an upper guide track portion configured to position the trailer door at an open position;
   a counterbalance shaft having a first drum and a second drum;
   a first cable having a first end portion coupled to a lower portion of the trailer door and a second end portion operably engaging the first drum;
   a second cable having a first end portion coupled to an upper portion of the trailer door and a second end portion operably engaging the second drum; and
   a motor configured to rotate the counterbalance shaft,
   wherein rotation of the counterbalance shaft by means of the motor causes the first and second drums to rotate and translate the first and second cables, respectively, to move the trailer door between the closed position and the open position.

20. The powered trailer door operating system of claim 19, wherein the motor is positioned at an intermediate axial position along the counterbalance shaft or positioned at an end of the counterbalance shaft.

21. The powered trailer door operating system of claim 19, further comprising a crossover member having an upper roller operably engaged with the guide track, and wherein the second end portions of the first and second cables are coupled to the upper portion of the trailer door via the crossover member.

22. The powered trailer door operating system of claim 19, further comprising a first door arm positioned between the trailer door and the second end portion of the first cable and a second door arm positioned between the trailer door and the second end portion of the second cable, wherein the first and second door arms respectively couple the first and second cables to the upper portion of the trailer door.

23. The powered trailer door operating system of claim 19, further comprising a controller for controlling the motor, wherein the controller is configured to receive a signal from:
   an operator via a user interface on a tractor and/or a trailer,
   a loading dock control system,
   a loading dock operator via a user interface at the loading dock, or
   an Automated Guided Vehicle (AGV), and
   wherein the controller is further configured to execute computer readable instructions that cause the trailer door to move between the closed and open positions in response to the signal.

24. The powered trailer door operating system of claim 23, wherein:
   the powered trailer door operating system is operably coupled to the trailer;
   the trailer comprises a first trailer contact patch and a second trailer contact patch positioned on an external surface of the trailer and electrically coupled to the controller;
   the first trailer contact patch has a positive polarity and is configured to contact a positive polarity loading dock contact patch when the trailer is positioned at the loading dock; and
   the second trailer contact patch has a negative polarity and is configured to contact a negative polarity loading dock contact patch when the trailer is positioned at the loading dock.

25. An automated latch system for use with a trailer, the trailer having a trailer door and a catch plate separate from the trailer door, the automated latch system comprising:
   a striker plate configured to be mounted to the trailer door and having a first flange with a first locking portion and a second flange with a second locking portion, the first and second locking portions configured to be positioned adjacent to the catch plate when the trailer door is in a closed position;
   a first locking arm rotatable from a stowed position below the catch plate to a deployed position extending above the catch plate to engage the first locking portion when the trailer door is in a closed position;
   a second locking arm rotatable from a stowed position below the catch plate to a deployed position extending above the catch plate to engage the second locking portion when the trailer door is in a closed position; and
   wherein the first locking arm rotates from the stowed position toward the deployed position in a first direction and the second locking arm rotates from the stowed position toward the deployed position in a second direction opposite to the first direction.

26. The automated latch system of claim 25, further comprising a bell crank coupled to the first locking arm by a first link and to the second locking arm by a second link, wherein rotation of the bell crank causes rotation of the first and second locking arms in opposite directions.

27. The automated latch system of claim 25, further comprising a motor operably coupled to one or both of the first and second locking arms and configured to rotate the first and second locking arms between the deployed position and the stowed position.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, for fluid (e.g., air) transfer, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. From the foregoing, it will be appreciated that specific embodiments of the invention have been described herein for purposes of illustration, but that various modifications may be made without deviating from the spirit and scope of the various embodiments of the invention. Accordingly, the invention is not limited, except as by the appended claims.

Any patents and applications and other references noted above, including any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the invention can be modified, if necessary, to employ the systems, functions, and concepts of the various references described above to provide yet further implementations of the invention.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A powered trailer door operating system for use with a trailer door of a trailer, comprising:
    a guide track having a lower guide track portion configured to position the trailer door at a closed position and an upper guide track portion configured to position the trailer door at an open position;
    a drive support coupled to the upper guide track portion, the drive support having a central cavity and a slot extending through the drive support into the central cavity, the slot positioned longitudinally along at least a portion of the drive support;
    a drive shaft positioned within the central cavity;
    a carriage slidingly coupled to the drive support and operably coupled to the trailer door, wherein the carriage is operably engaged with the drive shaft through the slot;
    a motor operably coupled to the drive shaft;
    a first trailer contact feature positioned on a first portion of an exterior surface of the trailer and operably connected to the motor; and
    a second trailer contact feature positioned on a second portion of the exterior surface of the trailer, wherein the first and second portions are spaced apart from each other and positioned on an aft portion of the trailer, wherein the first trailer contact feature is configured to automatically contact and electrically couple to a first station contact feature as the trailer backs up to a loading dock and the second trailer contact feature is configured to contact a second station contact feature, whereby the first and second trailer contact features collectively receive electrical power to drive the motor from an external power source via contact with the first and second station contact features, and whereby the motor rotates the drive shaft to cause the carriage to translate along the drive support, thereby moving the trailer door between the closed position and the open position.

2. The powered trailer door operating system of claim 1, wherein the drive shaft comprises helical screw-type threads, and wherein the carriage further comprises an engagement member having teeth configured to operably engage the helical screw-type threads.

3. The powered trailer door operating system of claim 1, further comprising a door arm pivotably coupled between the carriage and the trailer door.

4. The powered trailer door operating system of claim 1 wherein the drive support includes a semi-circular wall portion at least partially surrounding the central cavity, and wherein the carriage has an engagement portion configured to slidingly contact the semi-circular wall portion of the drive support.

5. The powered trailer door operating system of claim 1, wherein the motor is an in-line motor.

6. The powered trailer door operating system of claim 1, further comprising a controller for controlling the motor, wherein the controller is configured to receive a signal from:
- an operator via a user interface on a tractor and/or a trailer,
- a loading dock control system,
- a loading dock operator via a user interface at a loading dock, or
- an Automated Guided Vehicle (AGV), and
- wherein the controller is further configured to execute computer readable instructions that cause the motor to rotate the drive shaft to move the trailer door between the closed and open positions in response to the signal.

7. The powered trailer door operating system of claim 1, wherein the first trailer contact feature has a positive polarity, wherein the second trailer contact feature has a negative polarity, wherein the first station contact feature has a positive polarity, and wherein the second station contact feature has a negative polarity.

8. The powered trailer door operating system of claim 1, wherein the first and second station contact features include flexible portions configured to maintain contact with the first and second trailer contact features when the trailer is positioned proximate the loading dock and/or when the trailer is laterally misaligned with the loading dock.

9. The powered trailer door operating system of claim 1, wherein the trailer further comprises a grounding contact feature configured to contact a grounding member.

10. The powered trailer door operating system of claim 1, further comprising the trailer, wherein the guide track, the drive support, the drive shaft, the carriage, the trailer contact feature, and the motor are carried by the trailer.

11. The powered trailer door operating system of claim 1 wherein the first station contact feature is positioned at the loading dock.

12. The powered trailer door operating system of claim 1 wherein the first trailer contact feature and the first station contact feature each comprise a patch.

13. The powered trailer door operating system of claim 1 wherein the first trailer contact feature is positioned on a first side wall of the trailer and the second trailer contact feature is positioned on a second side wall of the trailer, opposite the first side wall.

14. The powered trailer door operating system of claim 1 wherein the first and second station contact features are mounted to a portion of the loading dock, and wherein the first and second trailer contact features collectively receive the electrical power from the first and second station contact features when the trailer is parked at the loading dock.

15. The powered trailer door operating system of claim 14 wherein the first and second station contact features are mounted to a face of the loading dock on opposite sides of a loading dock door.

\* \* \* \* \*